(12) United States Patent
Nagano

(10) Patent No.: US 7,229,311 B2
(45) Date of Patent: Jun. 12, 2007

(54) ELECTRONIC INSTRUMENT

(75) Inventor: Kota Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/339,557

(22) Filed: Jan. 26, 2006

(65) Prior Publication Data

US 2006/0202659 A1    Sep. 14, 2006

(30) Foreign Application Priority Data

Feb. 9, 2005    (JP)    ............................. 2005-032570

(51) Int. Cl.
*H01R 3/00* (2006.01)

(52) U.S. Cl. .................. 439/500; 439/159; 439/700

(58) Field of Classification Search ............... 439/180, 439/159, 925, 500, 515, 700, 824; 429/96–100, 429/121, 123

See application file for complete search history.

(56) References Cited

U.S. PATENT DOCUMENTS

| 6,783,390 B2 * | 8/2004 | Berg et al. .................. 439/500 |
| 6,948,975 B1 * | 9/2005 | Leung et al. ................ 439/500 |
| 7,104,815 B2 * | 9/2006 | Ng et al. ..................... 439/135 |

* cited by examiner

*Primary Examiner*—James Harvey
*Assistant Examiner*—Travis Chambers
(74) *Attorney, Agent, or Firm*—Oblon, Spivak, McClelland, Maier & Neustadt, P.C.

(57) ABSTRACT

Disclosed is an electronic instrument having a housing, a battery accommodating section provided in the housing, and a spring for battery ejection which is pressed by a battery inserted into the battery accommodating section and thus stored in power. In the instrument, the spring for battery ejection includes a spring force generation portion, a first arm portion provided at one end of the spring force generation portion, a second arm portion that is provided at the other end of the spring force generation portion and extends with a certain opening angle with respect to the first arm portion, a first shaft portion provided at an end of the first arm portion, and a second shaft portion provided at an end of the second arm portion. The first shaft portion is mounted in a first bearing portion provided in the housing, and the second shaft portion is slidably mounted in a second bearing portion provided in the housing.

8 Claims, 40 Drawing Sheets

ELECTRONIC INSTRUMENT

CROSS REFERENCES TO RELATED APPLICATIONS

The present invention contains subject matter related to Japanese Patent Application JP 2005-032570 filed in the Japanese Patent Office on Feb. 9, 2005, the entire contents of which being incorporated herein by reference.

BACKGROUND OF THE INVENTION

1. Field of the Invention

The present invention relates to an electronic instrument using a battery as a power source.

2. Description of the Related Art

As an electronic instrument including a so-called portable electronic instrument such as digital camera, an electronic instrument using a battery as a power source is known. The electronic instrument using the battery as the power source has a battery accommodating section for storing the battery in a housing, and the battery is loaded in the battery accommodating section by inserting the battery into the battery accommodating section. When the battery is charged, the battery is extracted from the battery accommodating section.

In the electronic instrument, an electronic instrument is known, in which a spring for battery ejection is provided for ease of extraction of the battery from the battery accommodating section.

For example, a coil spring 201 as shown in FIG. 43 is used for the spring for battery ejection. When a battery 202 is inserted into a battery accommodating section 203, the coil spring 201 is compressed by a front end face 202a of the battery 202 and thus stored in power, and when the battery 202 is further inserted to a predetermined position within the battery accommodating section 203, the battery 202 is locked by a battery lock member 204, and a battery cover 205 is closed. When locking by the battery lock member 204 is released, the battery cover 205 is opened, and the battery 202 is pushed out from the battery accommodating section 203 by spring force stored in the coil spring 201 (refer to JP-A-2001-223480).

SUMMARY OF THE INVENTION

However, there have been the following problems in the electronic instrument using the coil spring 201 for the spring for battery ejection in the related art.

(1) As shown in FIG. 44, even if the battery 202 is stored in the battery accommodating section 203 and thus the coil spring 201 is compressed, since the coil spring 201 has a height (length) H in accordance with the number of turns, a spring accommodating space 206 having at least the height H is necessary. To minimize the height H, it maybe considered that, for example, a coil spring 201 in a conical shape as shown in FIG. 45 is used in such a way that when it is compressed, it is deformed into a flat shape as shown in FIG. 46, thereby the height H of the spring accommodating space 206 is reduced. However, when the coil spring 201 in the conical shape is used, the maximum diameter is necessarily increased with increase in the number of turns; consequently the diameter of the spring accommodating space 206 is increased.

(2) In the case that the coil spring 201 is used for the spring for battery ejection, when the battery is not inserted as shown in FIG. 43, a tip of the coil spring 201 is free and not applied with so-called pre-load (spring force is not generated); and the spring force is generated when the battery 202 is inserted, thereby the coil spring 201 is compressed by the battery 202. The battery force is maximized in a condition that the battery 202 is completely received in the battery accommodating section 203. Therefore, when the battery 202 is inserted into the battery accommodating section 203, insertion force must be gradually increased; consequently the battery 202 can not be inserted with approximately constant force from the beginning. Moreover, since the coil spring 201 is not applied with pre-load as described before, in some cases, the battery 202 can not be surely ejected to a position of the tip of the coil spring 201 as shown in FIG. 43 in battery ejection due to the mass of the battery and the like.

It is desirable to provide an electronic instrument that can reduce the spring accommodating space compared with a case of using the coil spring for the spring for battery ejection in the related art.

It is further desirable to provide an electronic instrument that can press the spring for battery ejection with approximately constant force when the battery is inserted into the battery accommodating section.

An embodiment of the invention is directed to an electronic instrument having a housing, a battery accommodating section provided in the housing, and a spring for battery ejection which is pressed by a battery inserted into the battery accommodating section and thus stored in power. The electronic instrument is configured such that the spring for battery ejection is formed into an approximately V-shape by a spring force generation portion (torsion spring portion), a first arm portion provided at one end of the spring force generation portion, a second arm portion that is provided at the other end of the spring force generation portion and extends with a certain opening angle with respect to the first arm portion, a first shaft portion provided at an end of the first arm portion, and a second shaft portion provided at an end of the second arm portion. Moreover, the electronic instrument is configured such that the first shaft portion is mounted in a first bearing portion provided in the housing in a manner that it is when the spring is pressed by the battery, and the second shaft portion is mounted in a second bearing portion that is provided in the housing in a manner that it is movable when the spring is pressed by the battery.

In the electronic instrument of the embodiment of the invention, the second shaft portion is contacted to one end of the second bearing portion provided in the housing by spring force generated by the spring force generation portion (pressure contact), thereby desired pre-load can be applied to a tip of the spring for battery ejection. Accordingly, a battery can be surely ejected to a position of the tip of the spring for battery ejection by the pre-load. Moreover, when the spring force generation portion of the spring for battery ejection is pressed by the battery that has been inserted into the battery accommodating section, the second shaft portion is moved in a runout direction within the second bearing portion, thereby increase in spring force of the spring for battery ejection is restrained.

BRIEF DESCRIPTION OF THE DRAWINGS

Embodiments of the present invention will be described in detail based on the following figures, wherein.

DETAILED DESCRIPTION OF THE PREFERRED EMBODIMENTS

Hereinafter, an electronic instrument of the invention is described in order of a (1) general configuration of the electronic instrument as a whole, and (2) configuration of a spring for battery ejection, (3) configuration of a cap of a battery accommodating section, (4) configuration of a battery release lever, (5) configuration of a cap of a memory card accommodating section, (6) configuration of a housing, (7) configuration of a barrier, (8) configuration of a roller, (9) configuration of a barrier slide guide portion, (10) configuration of a toggle spring, and (11) configuration of a strap fitting.

(1) General Configuration of the Electronic Instrument as a Whole

Figure 1A:
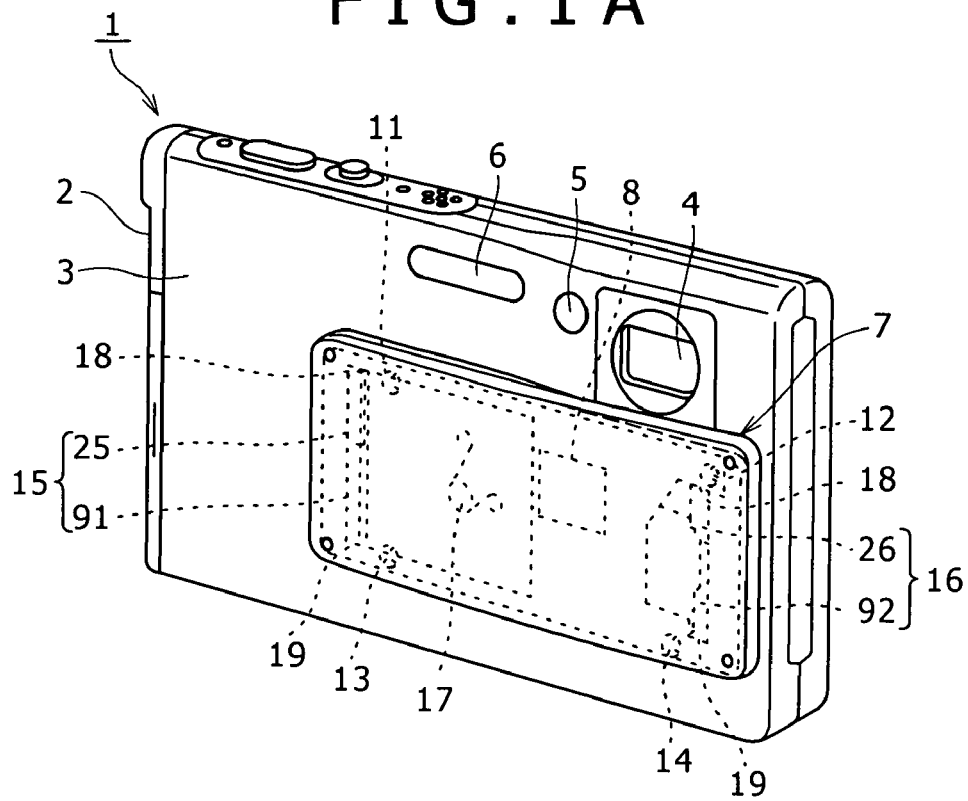
FIG. 1A is a perspective view of a condition where a barrier is moved to a first position (opening position)
Figure 1B:
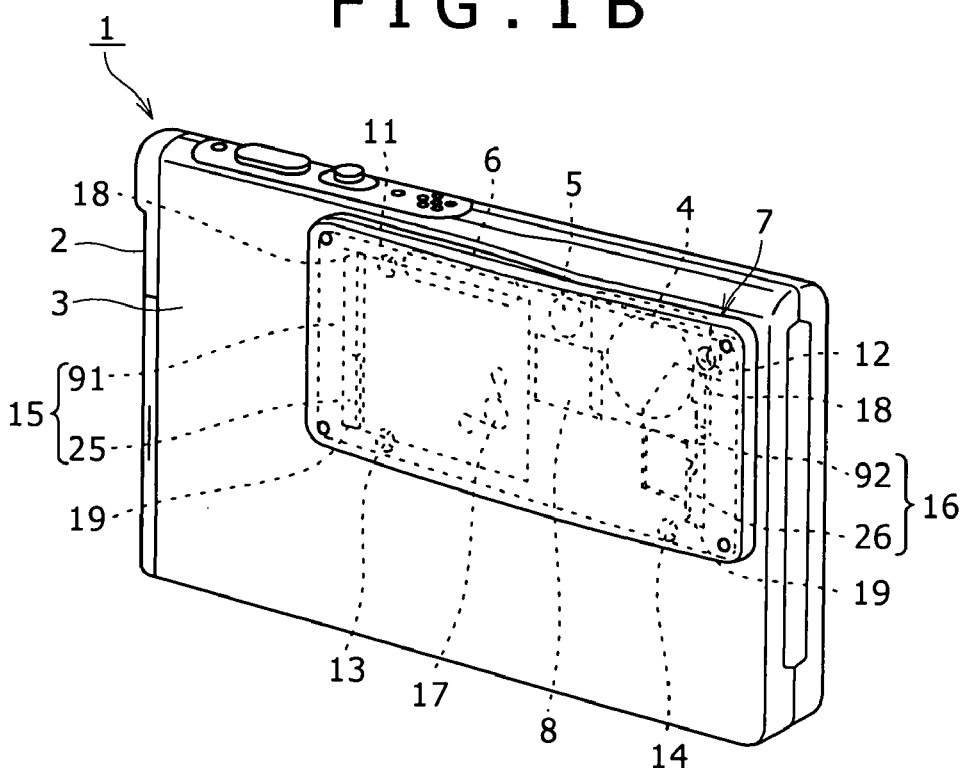
FIG. 1B is a perspective view of a condition where the barrier is moved to a second position (closing position)
Figure 2A:
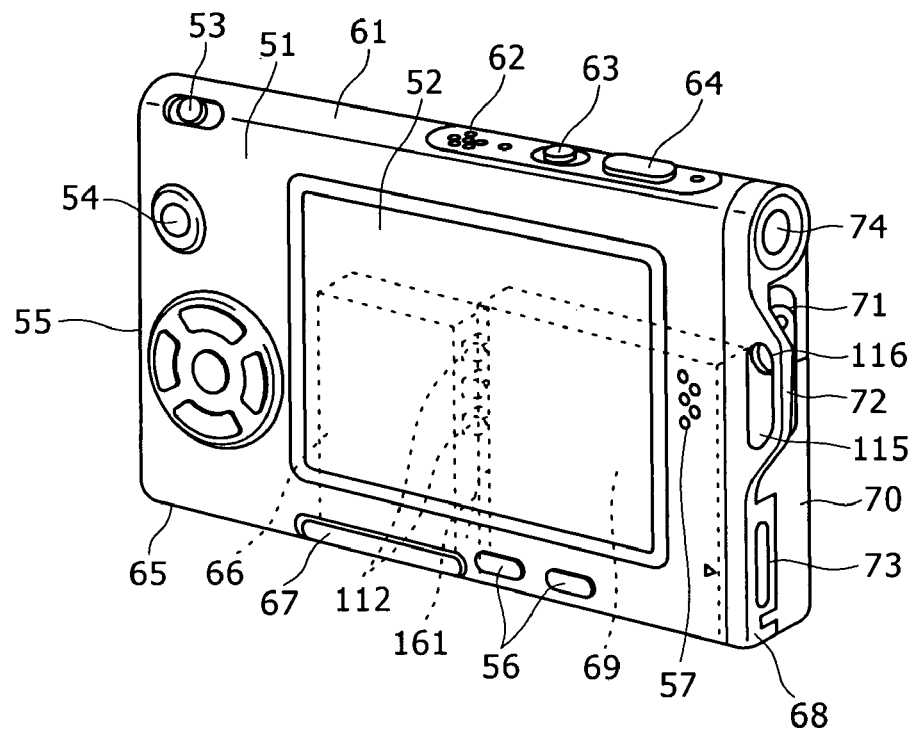
FIG. 2A is a perspective view of a camera seen from a back side.
Figure 2B:
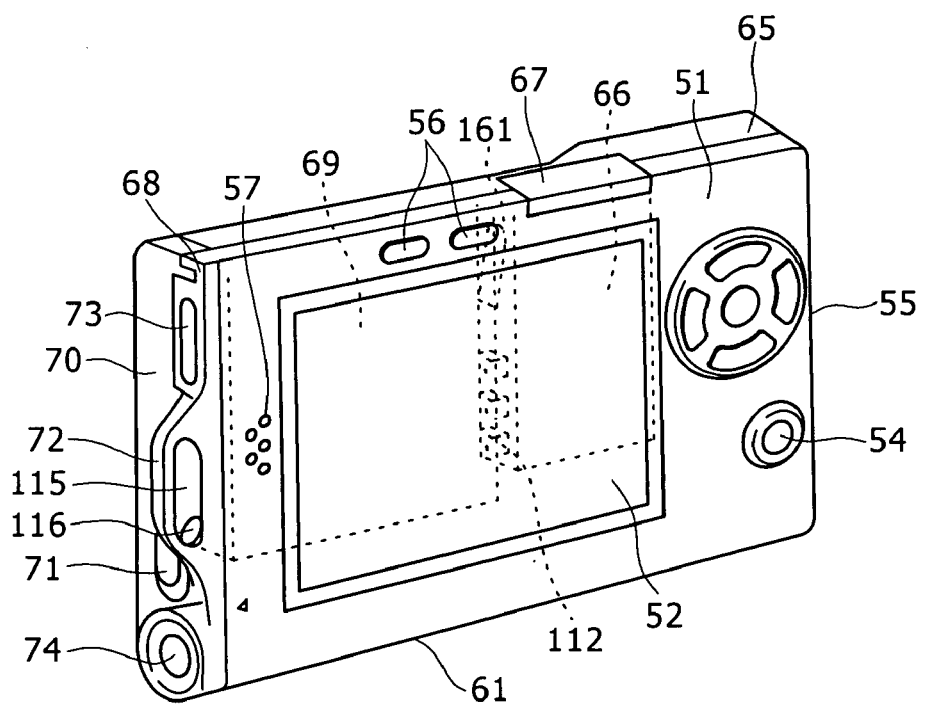
FIG. 2B is a perspective view of a camera seen from a bottom side.

FIG. 1A and FIG. 1B are perspective views of a digital steal camera as the electronic instrument of the invention seen from a first main surface (front) side, and FIG. 2 is a perspective view of the digital steal camera of the invention seen from a second main surface (back) side.

The digital camera 1 includes an image pickup lens 4, an AF illuminator 5 for emitting auxiliary light for automatic focusing, and a light emitter for flash 6, which are disposed facing on a first main surface 3 of a flat and rectangular housing 2, and includes a barrier (lens cover) 7 that is movable between a first position at which the image pickup lens 4, AF illuminator 5, and light emitter for flash 6 shown in FIG. 1A are exposed, and a second position at which the image pickup lens 4, AF illuminator 5, and light emitter for flash 6 are masked. An iris drive mechanism 8 received in the housing 2 partially projects from the first main surface 3 of the housing 2.

The iris drive mechanism 8 partially projects at a position where it is masked by the barrier 7 when the barrier 7 lies in the first position as shown in FIG. 1A, and also masked by the barrier 7 when the barrier 7 lies in the second position as shown in FIG. 1B.

The barrier 7 is formed in an approximately rectangular shape, and has first to fourth rollers 11 to 14 at four corners, which are contacted to the first main surface 3 of the housing 2, and has a pair of first and second barrier slide guide portions 15, 16 disposed in both sides in a moving direction. The barrier 7 is moved between the first and second positions on the first main surface 3 of the housing 2 by the first to fourth rollers 11 to 14 and the first and second barrier slide guide portions 15, 16.

The first barrier slide guide portion 15 is configured of a first barrier engagement member 25 provided at a side of the housing 2, and a rail-shaped, first barrier-engagement-member engagement-portion 91 which is provided at a barrier side and slidably overlapped by the first barrier engagement member 25, as described in detail later in a section of a configuration of the housing. The second barrier slide guide portion 16 is configured of a second barrier engagement member 26 provided at the side of the housing 2, and a rail-shaped, second barrier-engagement-member engagement-portion 92 which is provided at the barrier side and slidably overlapped by the second barrier engagement member 26, as the first barrier slide guide portion 15.

When the barrier 7 lies in the first position, as shown in FIG. 1A, first stopper portions 18 provided at one end sides of the rail-shaped, first and second barrier-engagement-member engagement-portions 91, 92 are pressed to the first and second barrier engagement members 25, 26 by spring force of a barrier biasing spring (hereinafter, called toggle spring), so that the image pickup lens 4, AF illuminator 5, and a light emitter for flash 6 are kept to be exposed. When the barrier lies in the second position, as shown in FIG. 1B, second stoppers 19 provided at the other end sides of the rail-shaped, first and second barrier-engagement-member engagement-portions 91, 92 are pressed to the first and second barrier engagement members 25, 26 by spring force of the toggle spring 17, so that the image pickup lens 4, AF illuminator 5, and a light emitter for flash 6, or part of the iris drive mechanism 8 are kept to be masked.

An accommodating section of a recoding medium such as memory card (hereinafter, called memory card accommodating section) 66 is provided in the housing 2. An opening of the memory card accommodating section 66 is provided at a side of a second end face (lower end face) 65 connecting between the first main surface 3 and the second main surface 51, and the opening is opened and closed by a cap for the memory card accommodating section (hereinafter, called memory card cap) 67. Moreover, a battery accommodating section 69 is provided in the housing 2. A battery cap 70 for opening and closing an opening of the battery accommodating section 69, a battery release lever 71 that allows insertion of the battery into the battery accommodating section 69 and extraction of the battery from the battery accommodating section 69, a strap fitting 72 on which the battery cap 70 is overlapped when the battery cap 70 is opened, a multiple connector connection terminal 73, and a power button 74 are provided on a third end face (right end face) 68 connecting between the first main surface 3 and the second main surface 51. The battery release lever 70 is disposed laterally to the battery cap 69 in a nonoverlapping condition on the battery cap 69. A battery contact terminal 112 and a spring for battery ejection 161 are provided on a back end face of the battery accommodating section 69.

When the battery is inserted into the battery accommodating section 69, the spring for battery ejection 161 is pressed by a front end face of the battery, and thus the spring for battery ejection 161 is stored in power. When the battery has been stored in the battery accommodating section 69, a terminal provided on the front end face of the battery is contacted to the battery contact terminal 112 provided on the back end face of the battery accommodating section 69. Therefore, a back of the battery is held by a tip of the battery release lever 71 to prevent the battery from slipping out of the battery accommodating section 69.

In the case that the battery is extracted from the battery accommodating section 69, when the back of the battery is released from being held by the battery release lever 71, the battery is pushed out by a certain level from the battery accommodating section 69 by spring force of the spring for battery ejection 161.

(2) Configuration of Spring for Battery Ejection

Figure 3:
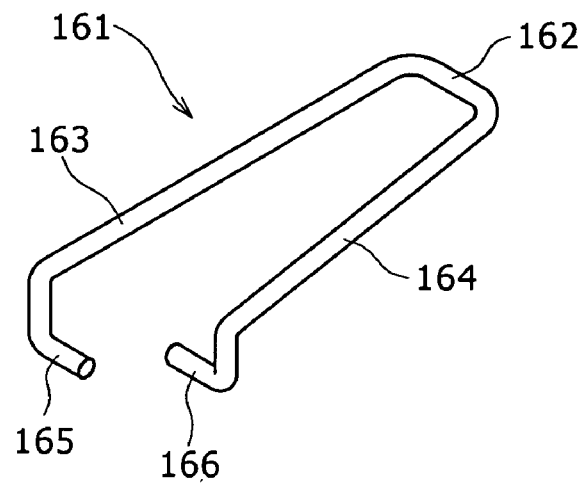
FIG. 3 is a perspective view of a spring for battery ejection of a first embodiment.

As shown in FIG. 3, the spring for battery ejection 161 includes a spring force generation portion (torsion spring portion) 162, first arm portion 163 provided at one end of the spring force generation portion 162, second arm portion 164 provided at the other end of the spring force generation portion 162, first shaft portion 165 provided at one end of the first arm portion 163, and second shaft portion 166 provided at an end of the second arm portion 164.

Figure 4:
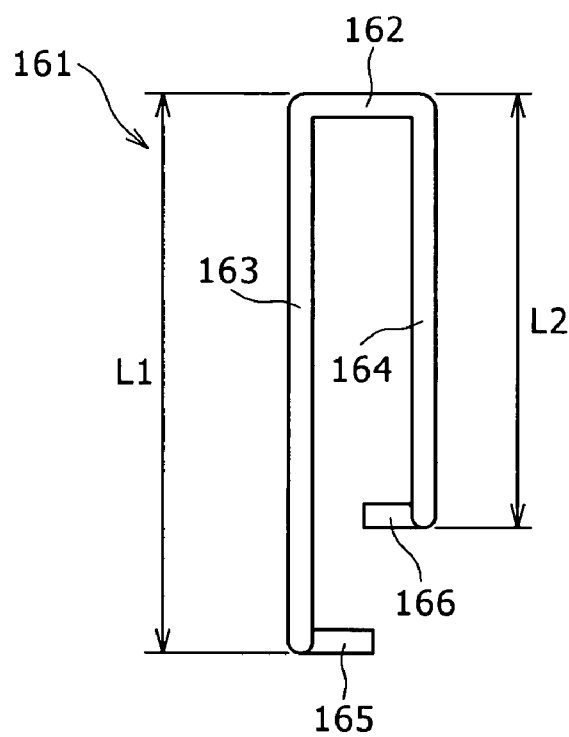
FIG. 4 is a plane view of the spring for battery ejection.
Figure 5:
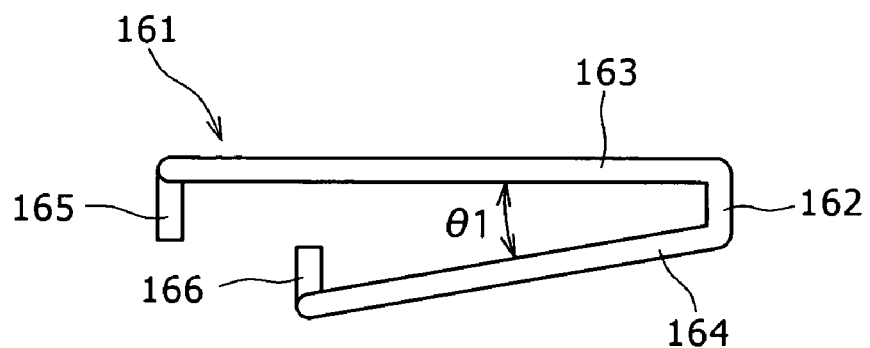
FIG. 5 is a side view of the spring for battery ejection.

As shown in a plane view of FIG. 4, the first arm portion 163 is disposed approximately parallel to the second arm portion 164. Length L1 of the first arm portion 163 is made longer than length L2 of the second arm portion 164 (L1>L2). As shown in a side view of FIG. 5, the first arm portion 163 and the second arm portion 164 are opened with a certain opening angle θ1.

The first shaft portion 165 is formed by inwardly folding an end of the first arm portion 163 approximately at a right angle, that is, toward a side of the second arm portion 164. The second shaft portion 166 is formed by inwardly folding an end of the second arm portion 164, that is, to a side of the first arm portion 163 approximately at a right angle. The spring for battery ejection 161 is configured as a so-called formed-wire-spring by folding a single, elastic metal wire.

Figure 6:
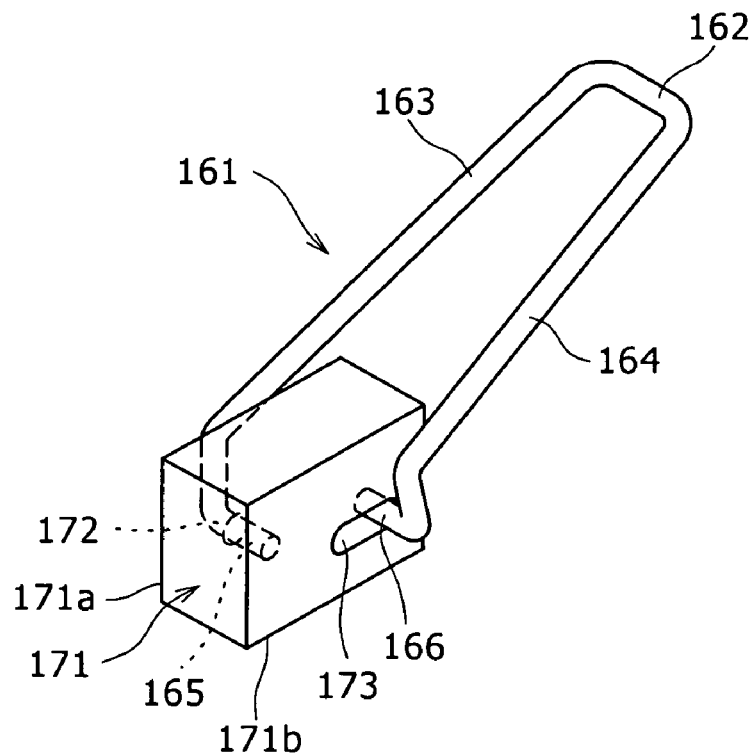
FIG. 6 is a perspective view of the spring for battery ejection in an attached condition.

As shown in FIG. 6, the first shaft portion 165 is rotatably mounted in a first bearing portion (bearing hole) 172 provided in one side face 171a of a spring attachment 171 provided in the housing. The second shaft portion 166 is slidably attached in a long-groove-like, second bearing portion 173 provided in the other side face 171b of the spring attachment portion 171, and slides within the long-groove-like, second bearing portion 173 along a longitudinal direction of the bearing portion when the spring force generation portion 162 is pushed during battery insertion.

Figure 7:
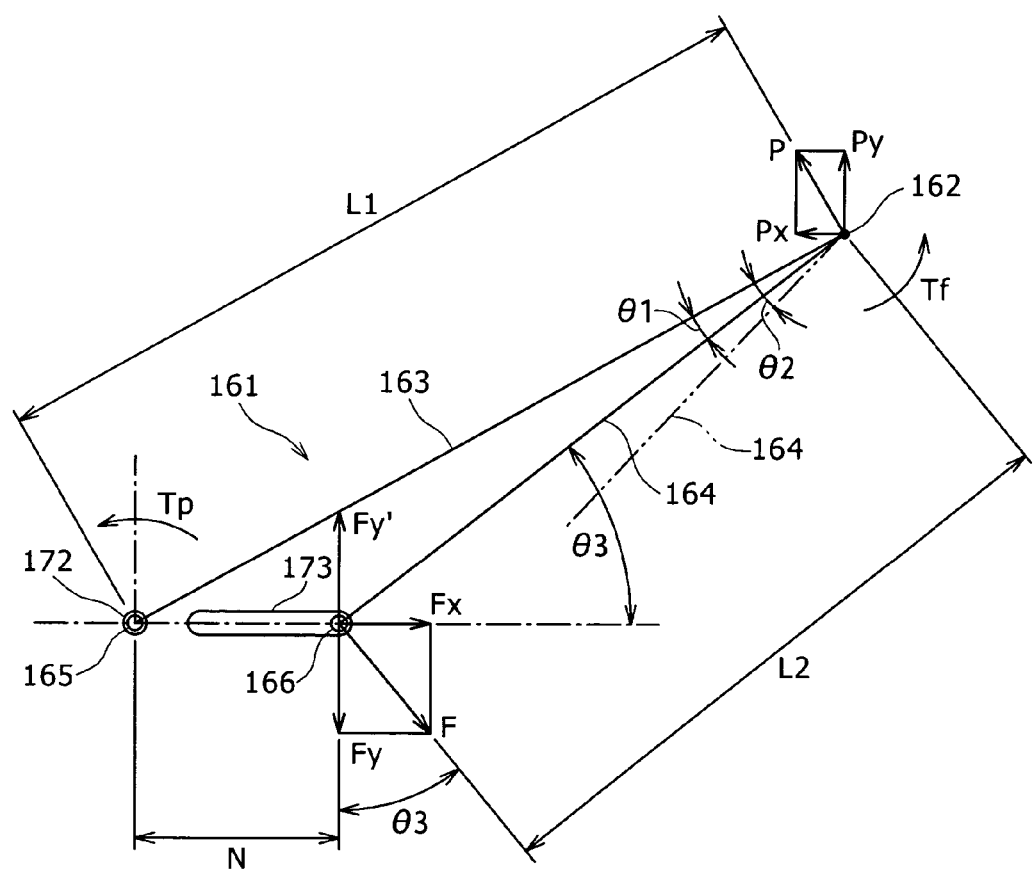
FIG. 7 is a schematic view for illustrating operation of the spring for battery ejection.

Next, operation of the spring for battery ejection 161 is described with reference to a schematic view show in FIG. 7. In FIG. 7, 161 is the spring for battery ejection, 162 is the spring force generation portion, 163 is the first arm portion, 164 is the second arm portion, 165 is a first shaft portion, 166 is a second shaft portion, 172 is a first bearing portion, 173 is a second bearing portion, and N is a distance between the first shaft portion 165 and the second shaft portion 166.

When the first shaft portion 165 is inserted into the first bearing portion 172 while the opening angle θ1 between the first arm portion 162 and the second arm portion 164, which is shown in a two-dot chain line, is compressed into an opening angle θ2 shown in a solid line, and the second shaft portion 166 is inserted into the second bearing portion 173, a force F is generated in the second shaft portion 166 due to the moment (spring force) Tf caused by the spring force generation portion 162 that is twisted. The force F can be decomposed into component force Fx and component force Fy, and the component force Fx presses the second shaft portion 166 to one end of the long-groove-like, second bearing portion 173. Reaction force Fy' of the component force Fy generates a force Tp (Tp=Fy×N) in a rotation direction in the first shaft portion 165. The force Tp generates a force P in the spring force generation portion 162 at a tip of the spring for battery ejection 161. Component force Py of the force P acts as battery ejection force.

Figure 8:
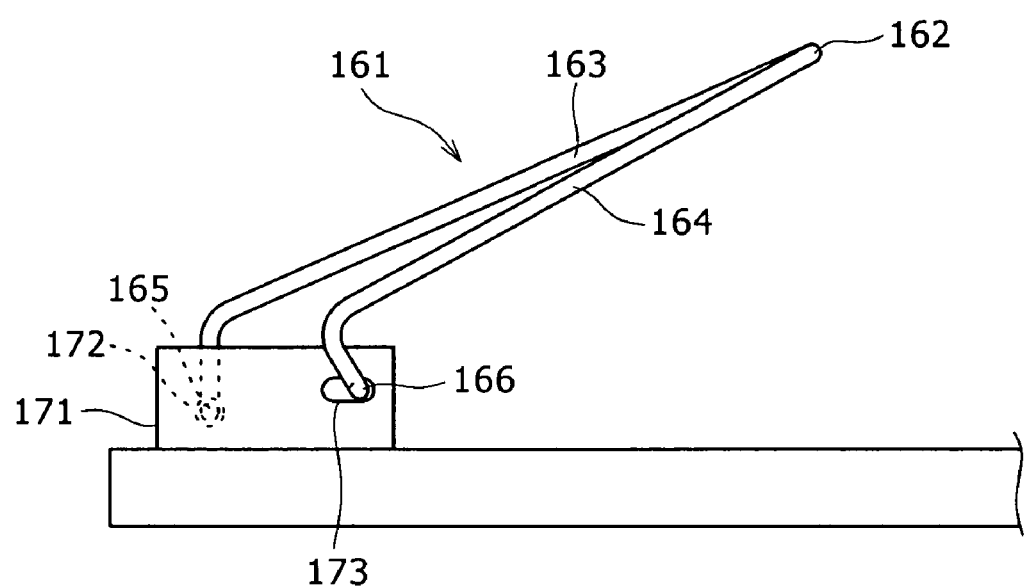
FIG. 8 is a side view showing a condition of the spring for battery ejection before battery insertion.
Figure 9:
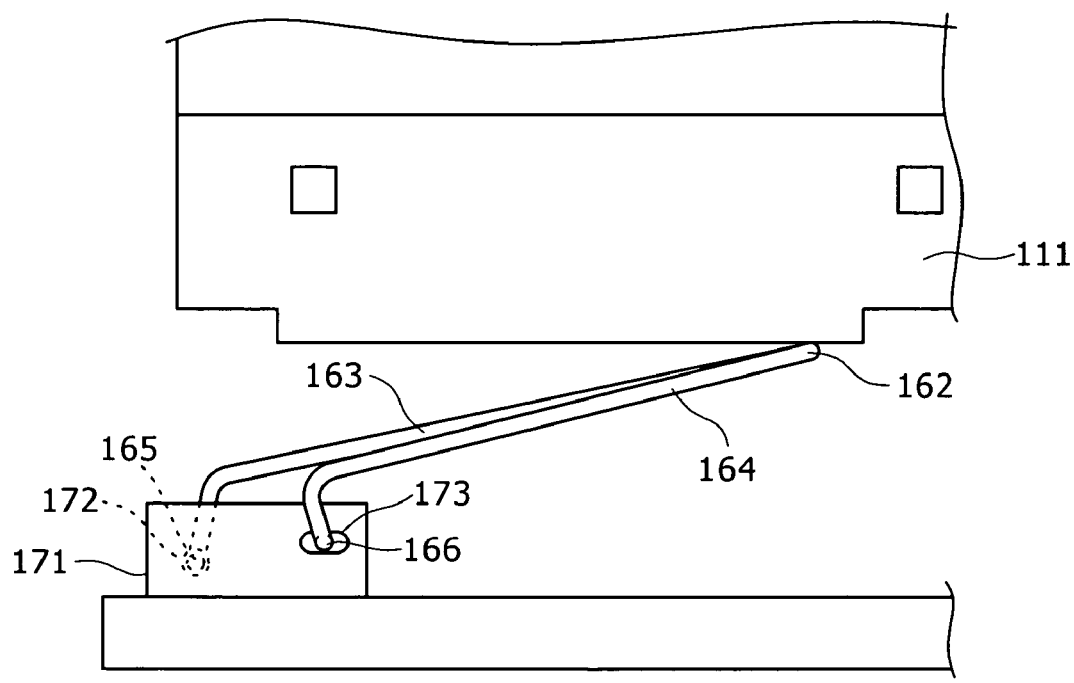
FIG. 9 is a side view showing a condition where the spring for battery ejection is pressed by a battery that has been inserted.

Next, operation of the second shaft portion 166 that is slidably moved within the second bearing portion 172 is described. Before the battery is inserted into the battery accommodating section, as shown in FIG. 8, the second shaft portion 166 is contacted to one end of the second bearing portion 173, and the spring for battery ejection 161 is inclined at a certain inclination angle. When the battery is inserted into the battery accommodating section, as shown in FIG. 9, the spring force generation portion 162 is pushed by an inserted battery 111, and the second shaft portion 166 is moved to a side of the first shaft portion 165 within the second bearing portion 172, consequently the spring for battery ejection 161 as a whole is gradually inclined as if it falls down.

As factors in increasing the Py, increase in the Tf due to increase in displacement level (twist level) of the spring force generation portion 162, and increase in the Fy due to decrease in operation angle θ3 of the F are given; and operation points of the Fy used for calculating the Tp (Tp=Fy×N), that is, the first shaft 165 and the second shaft 166 are moved closer to each other to decrease the N, thereby increase in the TF can be restrained. The length L1 of the first arm 163 is made closer to the length L2 of the second arm 164, thereby a setting can be made, in which the force Py exerted on the battery 111 is smaller in a condition shown in FIG. 9 than in a condition shown in FIG. 8. That is, a virtual spring coefficient (a relational value between a stroke and a load in the case that a compression coil spring is supposed to be used) can be freely set. That is, for example, when a coil spring having a large diameter is used, the spring can be easily made to have a portion between two points in a stroke of the spring, the portion having such a deflection characteristic that the load is substantially unchanged even if the spring is shifted between the two points. The invention can realize the portion having such a characteristic in a limited space.

Figure 10:
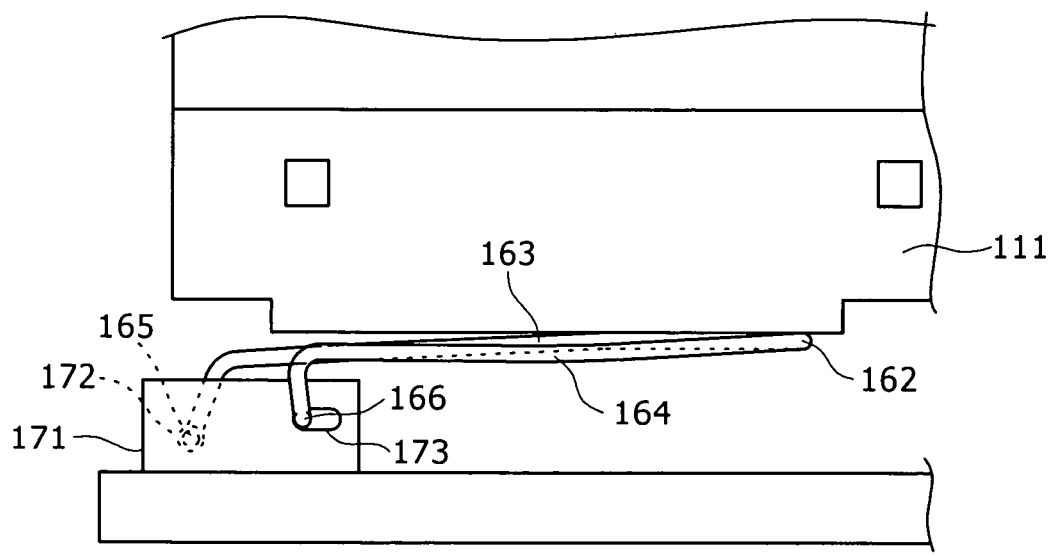
FIG. 10 is a side view showing a condition of the spring for battery ejection after the battery has been stored.

In the case that the first arm portion 163 is straightly formed, when the battery is inserted, as shown in FIG. 10, the first arm portion 163 is sometimes curved in a raised manner, which may interfere accommodating section of the battery in the battery accommodating section.

Figure 11:
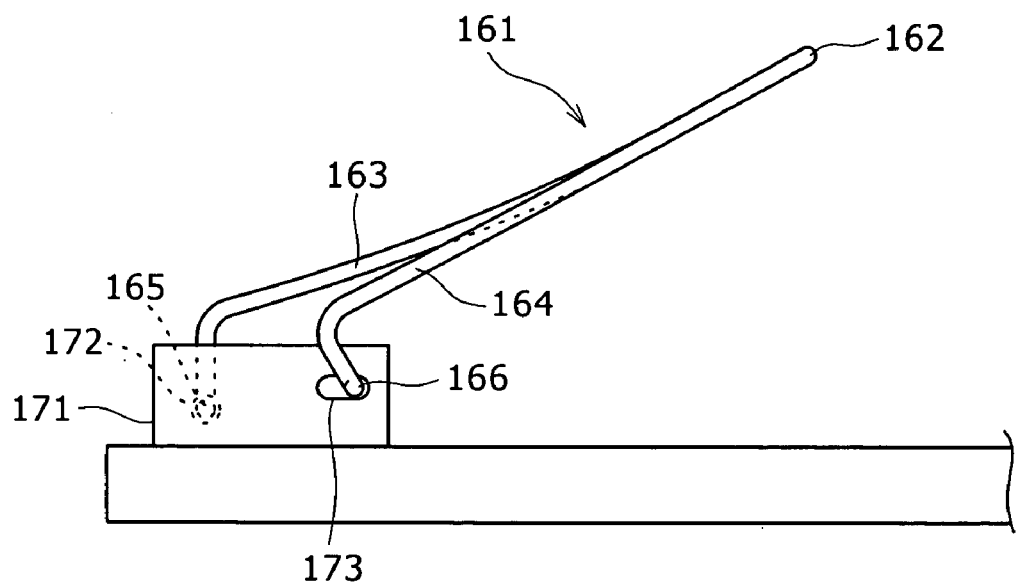
FIG. 11 is a side view of a case that a first arm portion has been previously curved.
Figure 12:
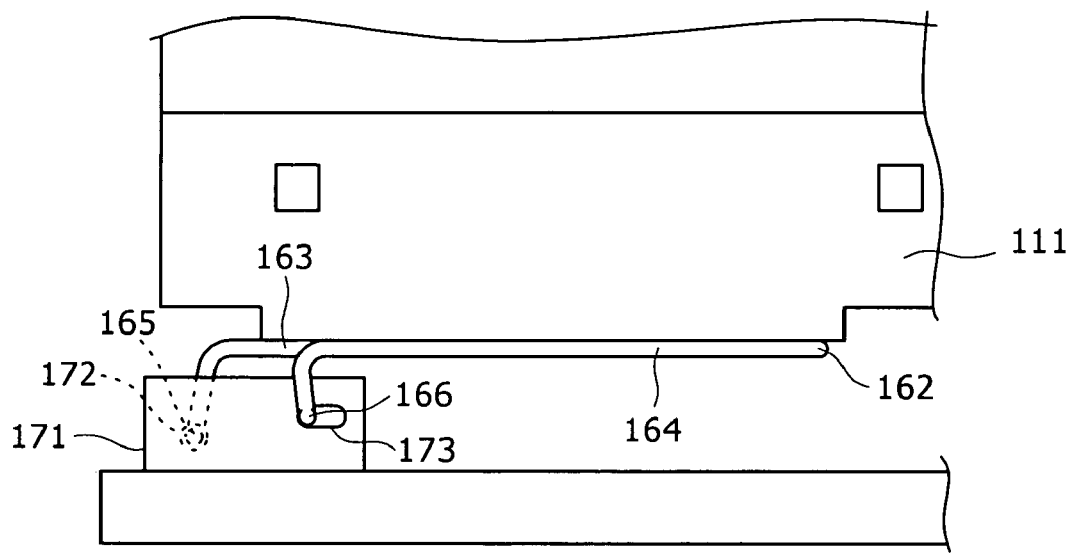
FIG. 12 is a side view of a condition that a curved, first arm portion is straightly stretched by the battery.

In such a case, as shown in FIG. 11, the first arm portion 163 is previously curved such that when the battery is inserted, the first arm portion 163 is stretched straightly as shown in FIG. 12, thereby the trouble can be solved.

Figure 13:
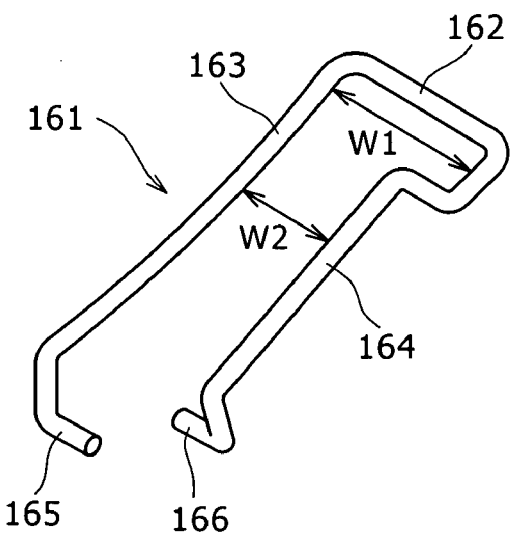
FIG. 13 is a perspective view of a second embodiment of the spring for battery ejection.
Figure 14:
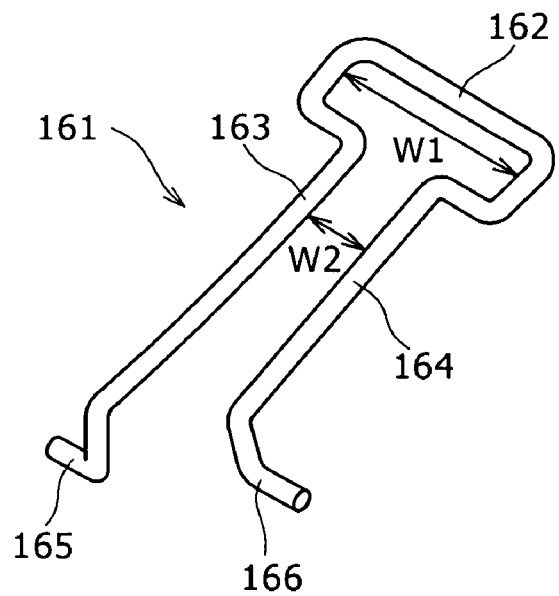
FIG. 14 is a perspective view of a third embodiment of the spring for battery ejection.
Figure 15:
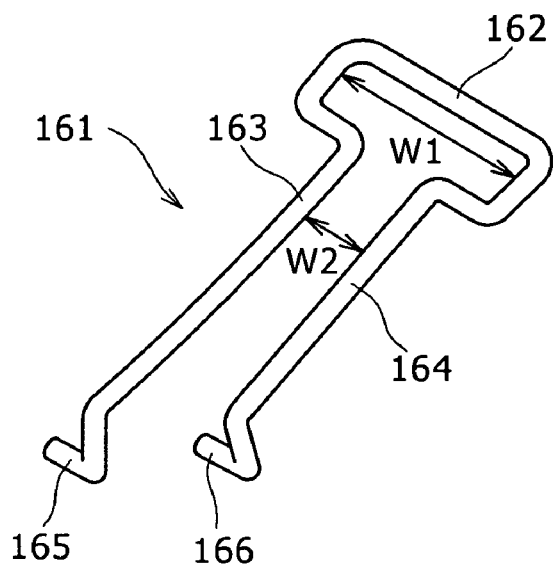
FIG. 15 is a perspective view of a fourth embodiment of the spring for battery ejection.

As shown in FIG. 13 and FIG. 14, the spring force generation portion 162 may be formed to have a width W1 that is larger than a width W2 between the first arm portion 163 and the second arm portion 164. By making the width W1 of the spring force generation portion 162 larger than the width W2 between the first arm portion 163 and the second arm portion 164, the spring force generation portion 162 can be surely contacted to the front end face of the battery. While a case that the first shaft portion 165 and the second shaft portion 166 were formed in a forward direction to each other was shown in the embodiment, the portions 165 and 166 may be formed in a backward direction to each other as shown in FIG. 14. Alternatively, as shown in FIG. 15, the first shaft portion 165 and the second shaft portion 166 may be formed to face toward the same direction.

While the embodiment was configured in a way that the second shaft portion 166 was slidable, and the first shaft portion 165 was rotatable as shown in FIG. 6, the same effect can be obtained even if a configuration that the second shaft portion 166 is rotatable, and the first shaft portion 165 is slidable is made conversely. While the embodiment was described using the digital camera as the image pickup device as an example of the electronic instrument of the invention, the invention can be widely applied to electronic instruments using a battery such as a mobile phone, mobile game machine and mobile computer, in addition to the image pickup device such as digital camera. Moreover, it will be appreciated that the spring structure is not limitedly used for a battery ejection device of an electronic instrument, and can be widely used for ejection devices in various mechanical structures, and a ejection device of a recording medium such as tape cassette and disk cartridge, in addition, used for various types of industrial machines, automobiles, and general instruments such as toys.

(3) Configuration of Cap of Battery Accommodating Section (Battery Cap)

Figure 21:
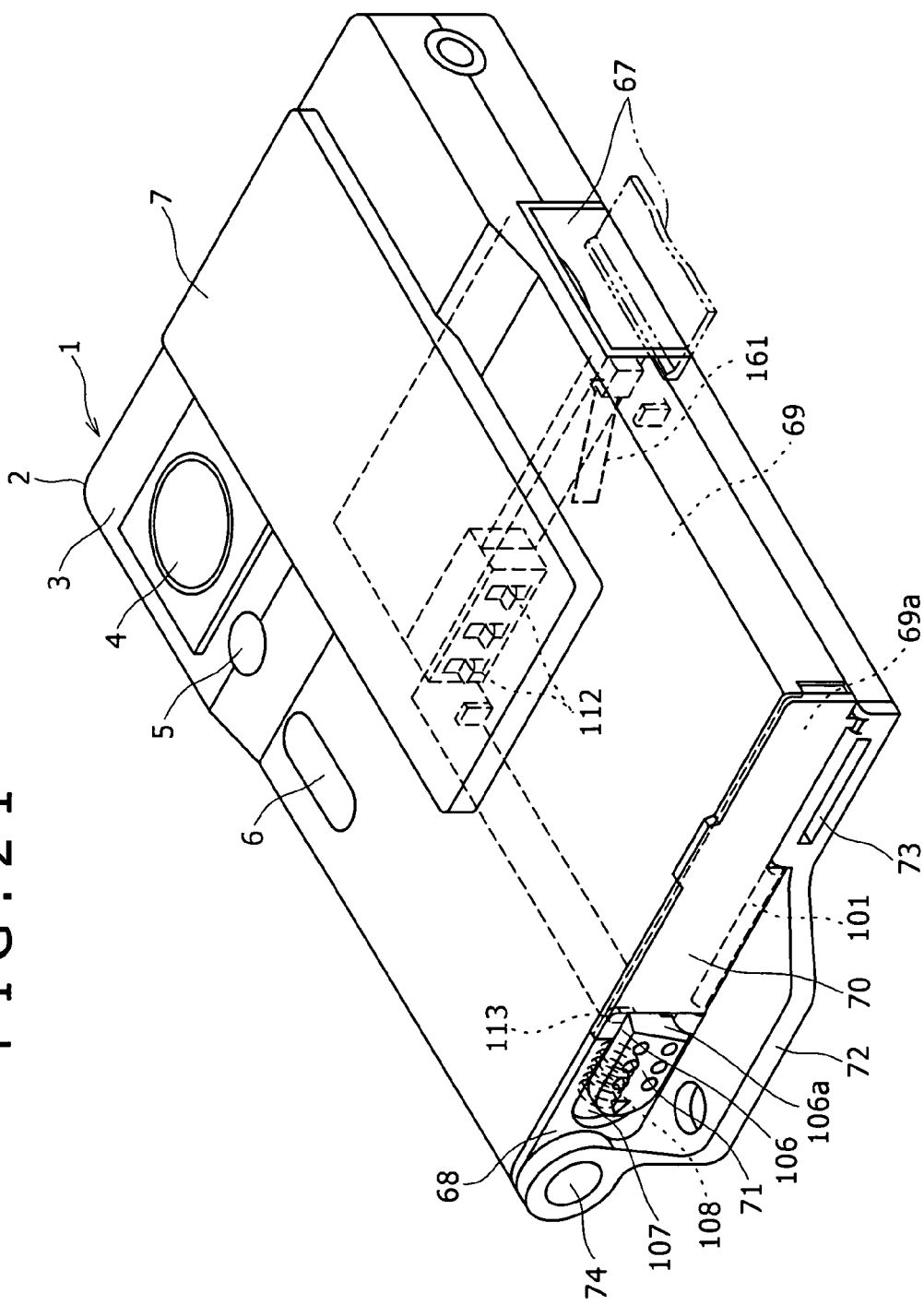
FIG. 21 is a perspective view of a condition where a battery cap is closed.

As shown in FIG. 21, on an end face 68 connecting between the first main surface 3 and the second main surface 51, a battery cap 70 for opening and closing an opening 69a of the battery accommodating section 69, the battery release lever 71 that allows insertion and extraction of the battery with respect to the battery accommodating section 69, a strap fitting 72 on which the battery cap 70 is overlapped when the battery cap 70 is opened, and the multiple connector connection terminal 73 are provided. The battery release lever 71 is disposed with being laid outside of one longitudinal end of the battery cap 70.

Figure 22:
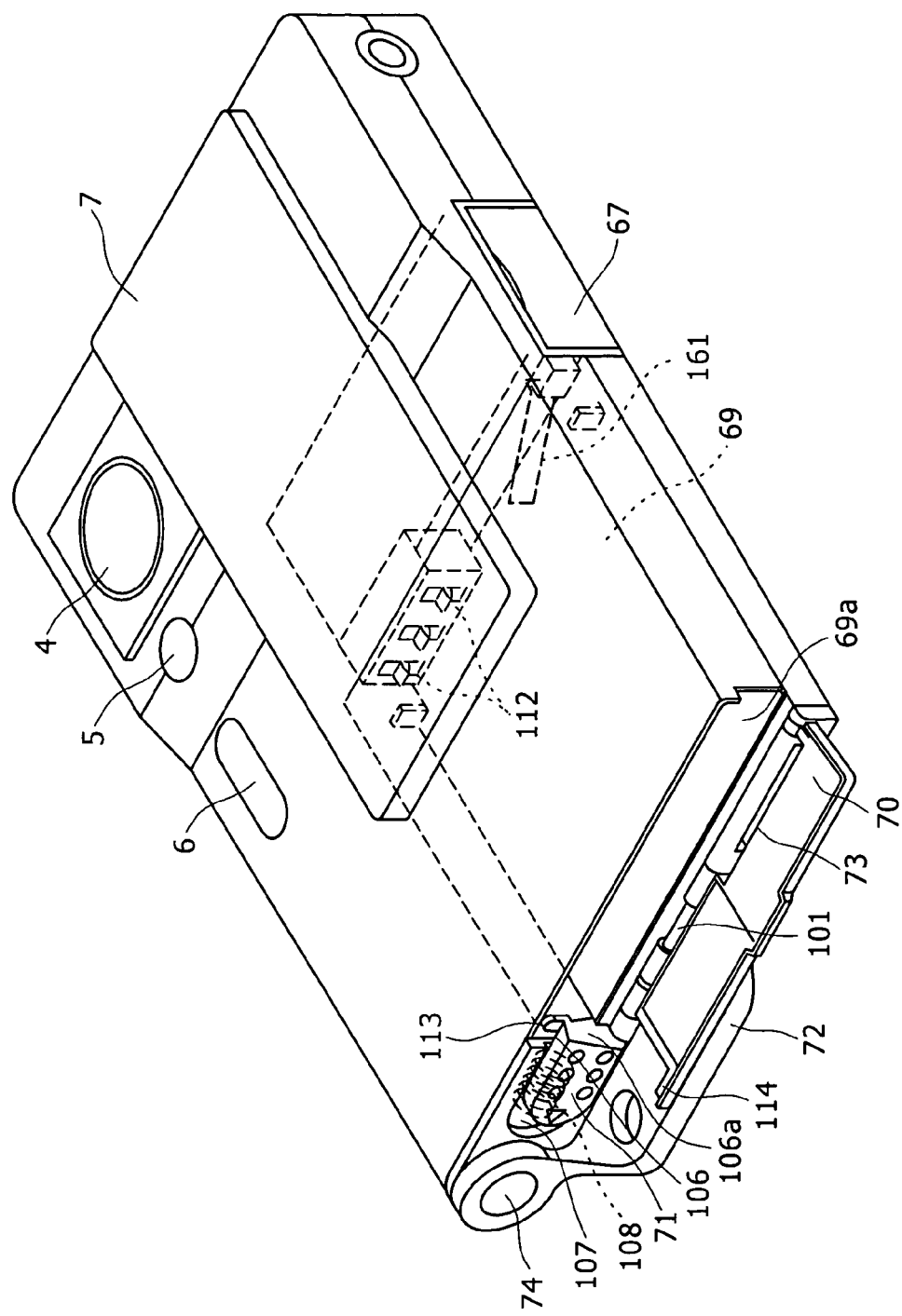
FIG. 22 is a perspective view of a condition where the battery cap is opened.

The battery cap 70 is rotatably attached to the housing 2 with a shaft 101, and when it is rotated in the clockwise direction with the shaft 101 as a center, it overlaps on the end face 68 of the housing 2 and closes the opening 69a as shown in FIG. 21. When the battery cap 70 is rotated at approximately 100 degrees in the counterclockwise direction in a condition shown in FIG. 21, as shown in FIG. 22, the cap 70 is opened and overlaps on the strap fitting 72, thereby further rotation is restricted and the cap is protected by the strap fitting 72.

Figure 23:
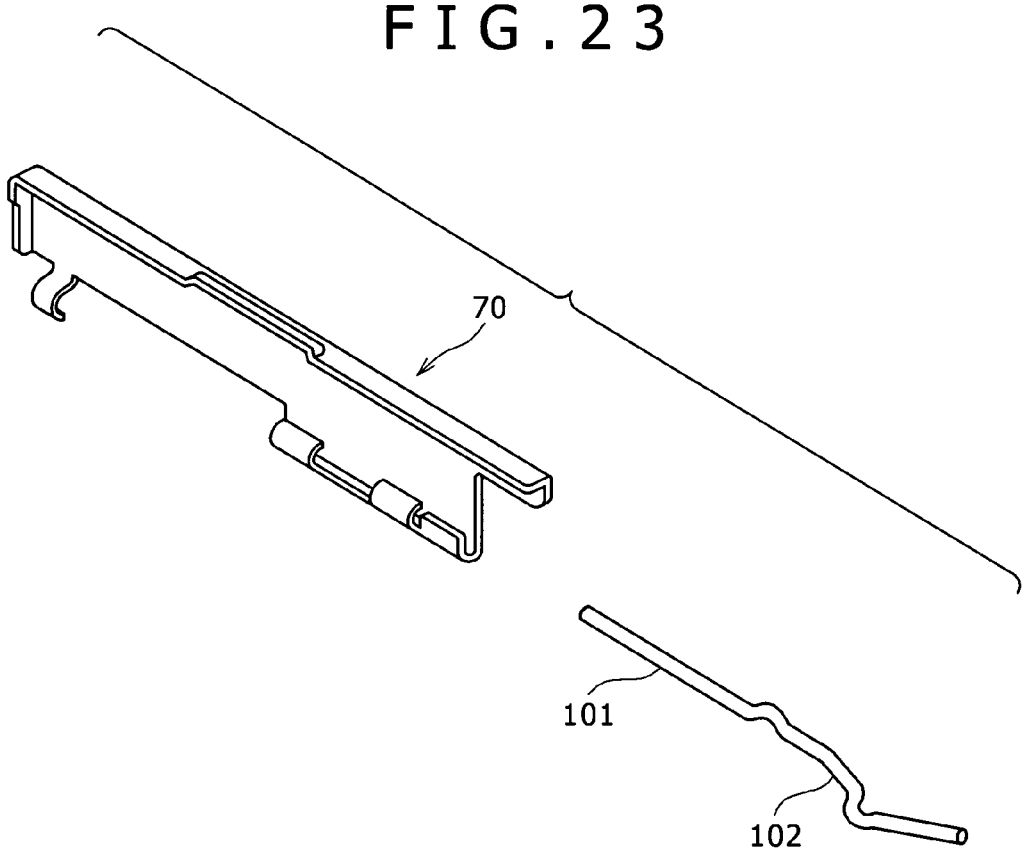
FIG. 23 is a perspective view showing the battery cap and a shaft.
Figure 24:
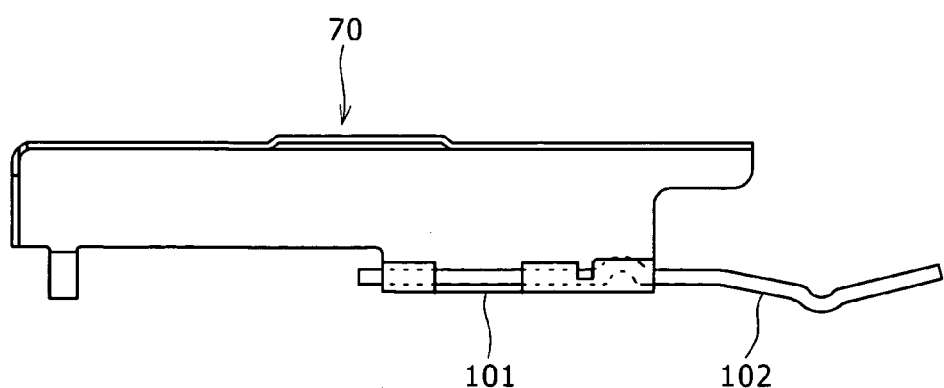
FIG. 24 is a front view of a condition where the shaft is attached to the battery cap.

As shown in FIG. 23, the shaft 101 is made of an elastic metal bar; and has one end side at which a spring portion 102, which presses the battery cap 70 to the end face 68 of the housing 2 when the battery cap is closed, and presses the battery cap 70 to the strap fitting 72 when the battery cap is opened, is provided. The spring portion 102 is formed integrally with the shaft 101 by folding the one end side of the shaft 101, and contacted to a spring contact surface 103 provided at a housing 2 side as shown in FIG. 25A, FIG. 25B and FIG. 25C.

Figure 25A:
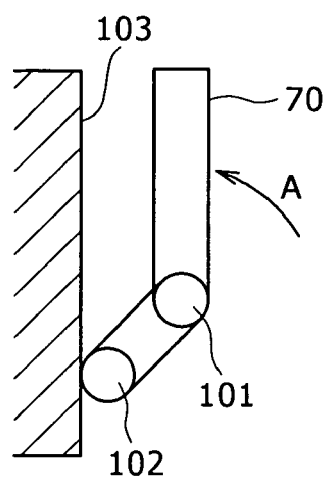
FIG. 25A is an illustrative view showing operation of a spring portion provided at one end of the shaft.
Figure 25B:
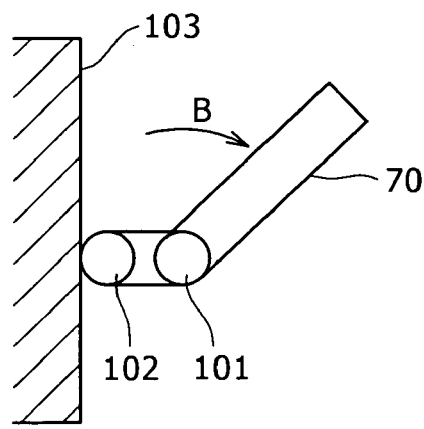
FIG. 25B is an illustrative view showing operation of the spring portion provided at the one end of the shaft.
Figure 25C:
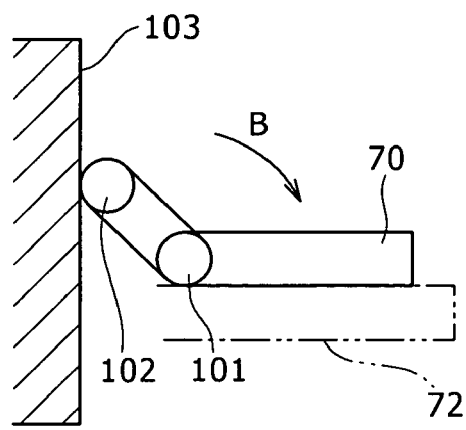
FIG. 25C is an illustrative view showing operation of the spring portion provided at the one end of the shaft.

When the battery cap 70 is closed, as shown in FIG. 25A, the spring portion 102 is contacted to the spring contact surface 103 provided at the housing 2 side to add a rotational force in an arrow A direction (clockwise direction) to the shaft 101 and the battery cap 70 so that the battery cap 70 is pressed to the end face 68 of the housing 2. When the battery cap 70 is rotated in an opening direction (arrow B direction) in a condition shown in FIG. 25A, the spring portion 102 is pushed by the spring contact surface 103 and thus gradually deformed; and as shown in FIG. 25B, when the battery cap is opened at a certain angle, for example 45 degrees, the spring portion 102 is maximally deformed, and lies in a neutral position at which the shaft 101 and the battery cap 70 are not added with the rotational force. When the battery cap 70 is further rotated in an opening direction (arrow B direction) in a condition shown in FIG. 25B, then the spring portion 102 generates a spring force in a direction of opening the battery cap 70 (arrow B direction), and the battery cap 70 is pressed to the strap fitting 72, so that the opening 69a of the housing 2 is kept opened.

(4) Configuration of Battery Release Lever

As shown in FIG. 21 and FIG. 22, the battery release lever 71 is attached to a lever guide portion 107 provided on the first end face 68 in such a way that a battery engagement portion 106 provided on one end is slidable between a position where the opening 69a of the battery accommodating section 69 is partially closed and a position where the opening 69a is opened. The battery release lever 71 is biased to the position where the opening 69a of the battery accommodating section 69 is partially closed by a spring member 108 disposed on a bottom side. A top of the battery engagement portion 106 forms a slope-like battery pushing-out surface 106a.

Figure 26:
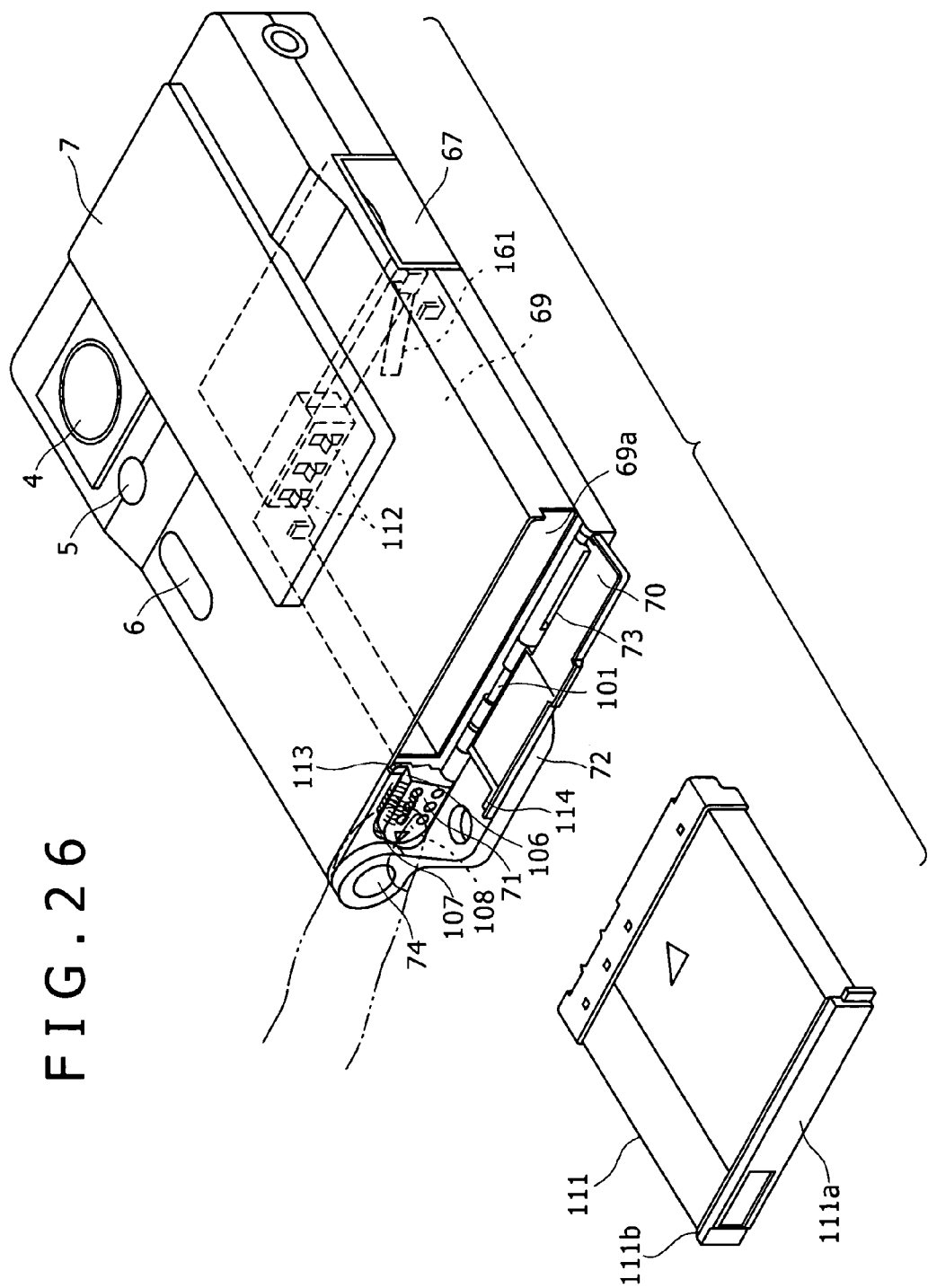
FIG. 26 is a perspective view showing a condition where the battery cap is opened before the battery is stored.

As shown in FIG. 26, the battery 111 is inserted into the battery accommodating section 69 while the battery release lever 71 is pushed back to a position where the battery 111 can be inserted against the spring force of the spring member 108 without interference, that is, a position where the opening 69a is opened. When the battery is inserted into the battery accommodating section 69, the spring for battery ejection 161 is pushed by the fronted face of the battery 111 and deflected to be stored in power. Then, the terminal provided on the front end face of the battery 111 is contacted to the battery terminal provided on the back end face of the battery accommodating section 69.

Figure 27:
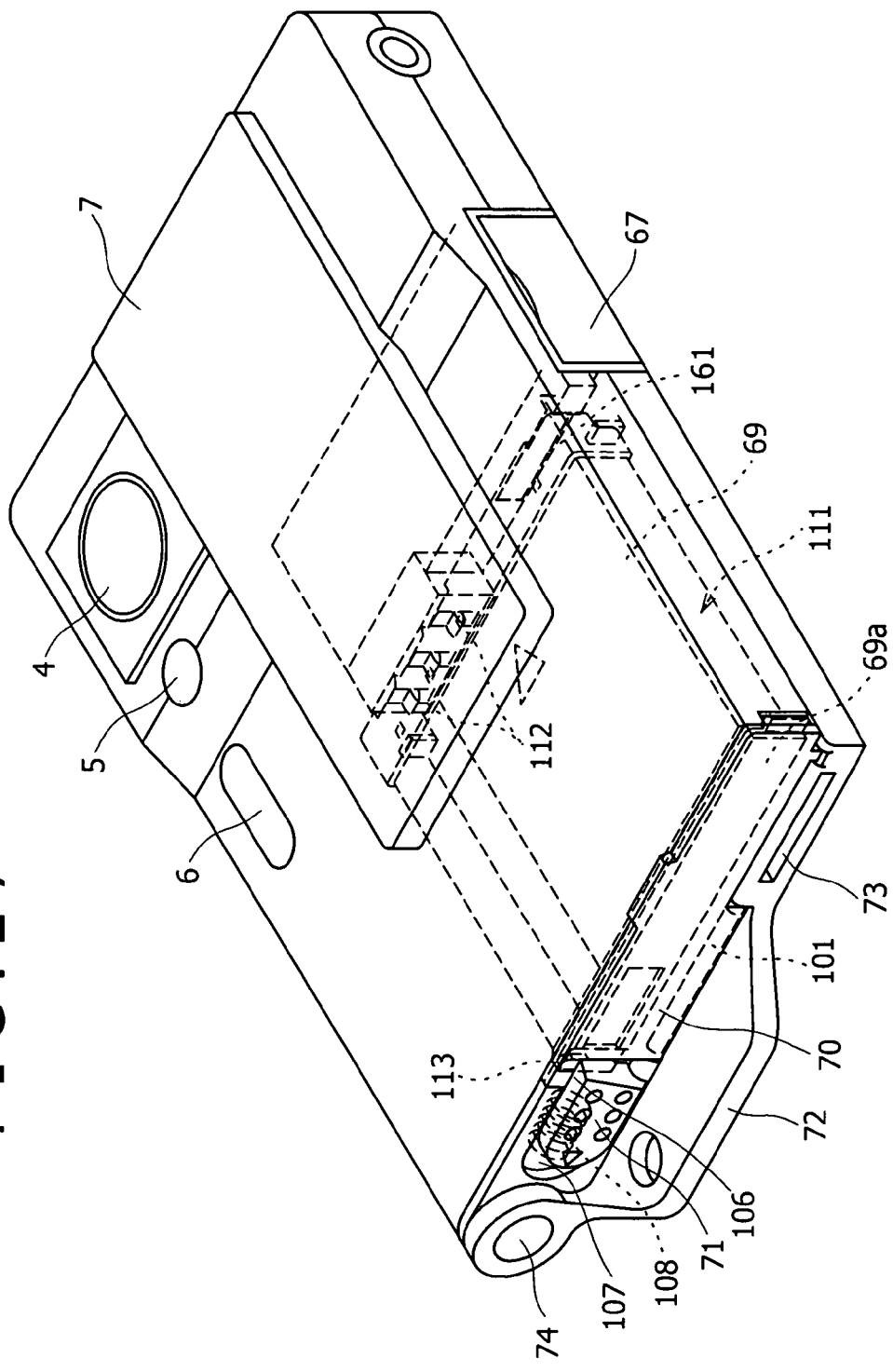
FIG. 27 is a perspective view showing a condition where the battery has been stored and the battery cap is closed.

After the battery 111 is stored in the battery accommodating section 69, when pushing back of the battery release lever 71 is released, the lever 71 automatically returns to the position where the opening 69a of the battery accommodating section 69 is partially closed by spring force of the spring member 108, thereby prevents the battery 111 from falling out from the battery accommodating section 69. Then, the battery cap 70 is closed as shown in FIG. 27, and insertion operation of the battery is completed.

If the battery release lever 71 can be pushed back while the battery cap is still closed, in the case that the lever 71 is pushed back by mistake, the battery 111 is sometimes pushed out from the battery accommodating section 69 by spring force of the battery contact terminal 112 provided on the back end face of the battery accommodating section 69. When the battery is pushed out slightly, in some cases, it is not clearly found that the battery 111 is not perfectly stored in the battery accommodating section 69 because the battery cap 70 exists.

Figure 28:
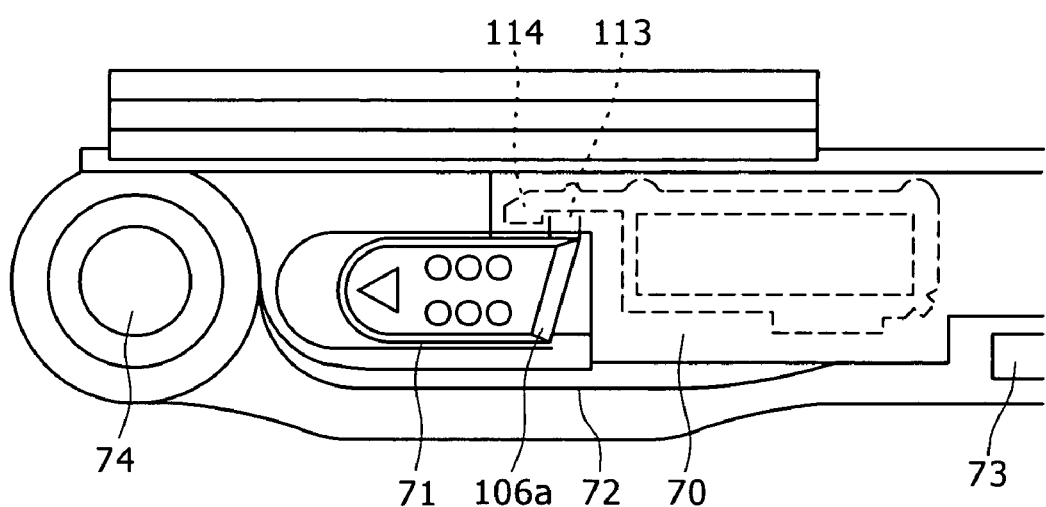
FIG. 28 is an illustrative view showing a condition where a battery release lever can not be pushed back.

Thus, as shown in FIG. 26, while a cap engagement portion 113 is provided in the battery release lever 71, a battery release lever engagement portion 114 is provided on the battery cap 70, thereby when the battery cap 70 is closed, as shown in FIG. 28, the battery release lever engagement portion 114 is located laterally to the cap engagement portion 113, and thereby when the battery release lever 71 is tried to be moved to a pushing back direction, the cap engagement portion 113 is engaged with the battery release lever engagement portion 114 in order to prevent the battery release lever 71 from being pushed back while the battery cap 70 is still closed.

Figure 29:
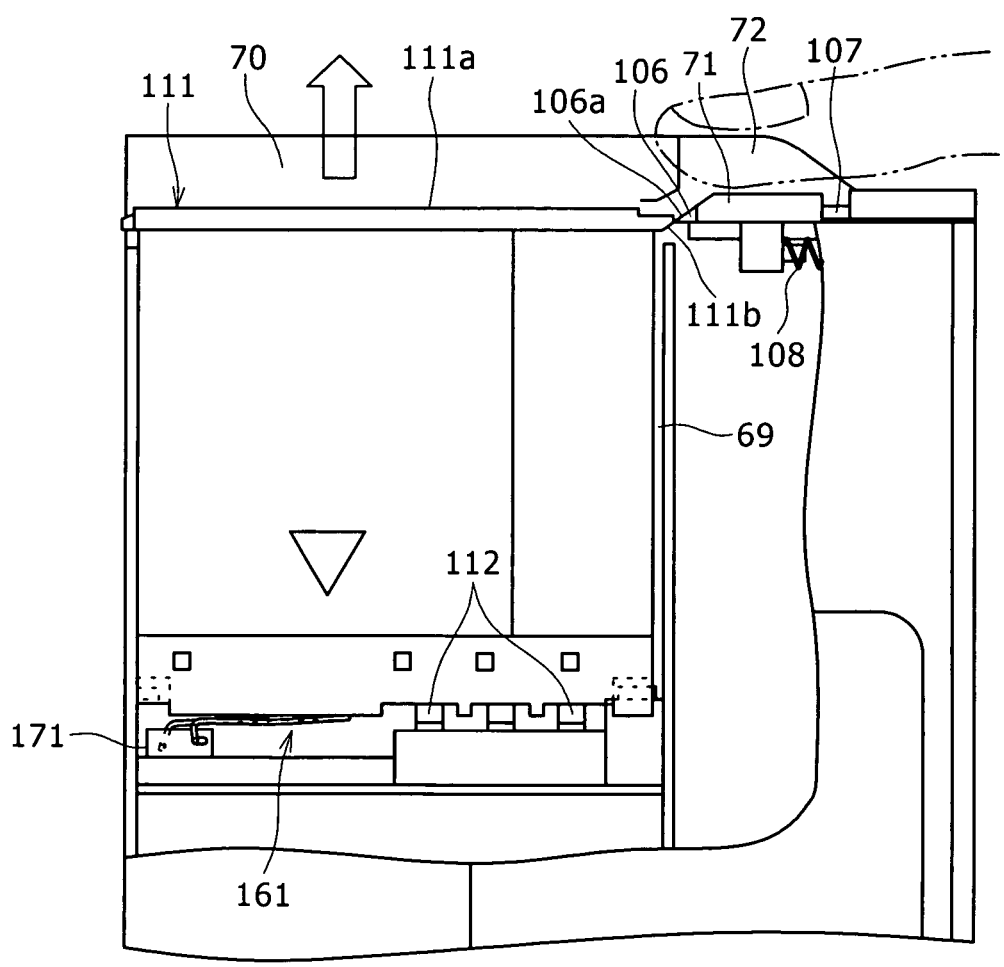
FIG. 29 is an illustrative view of a condition where the battery has been pushed out by a terminal in the battery accommodating section.

Extraction of the battery 111 from the battery accommodating section 69 is performed by pushing back the battery release lever 71 against the biasing force of the spring member 108 after opening the battery cap 70. When the battery release lever 71 is pushed back and thus hold of the battery 111 is released, as shown in FIG. 29, the battery 111 is pushed out from the battery accommodating section 69 by spring force of the spring for battery ejection 161.

Figure 30:
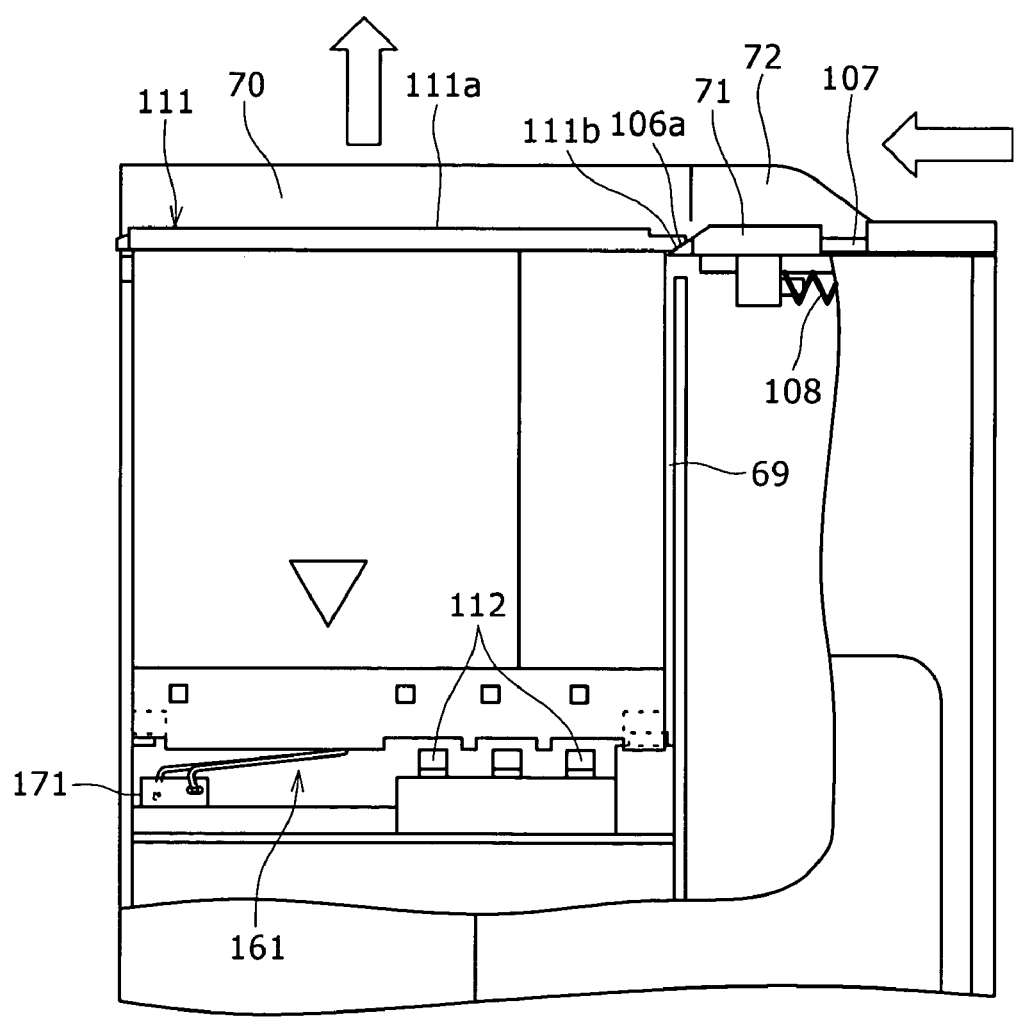
FIG. 30 is an illustrative view showing a condition where the battery is pushed out by the battery release lever.
Figure 31:
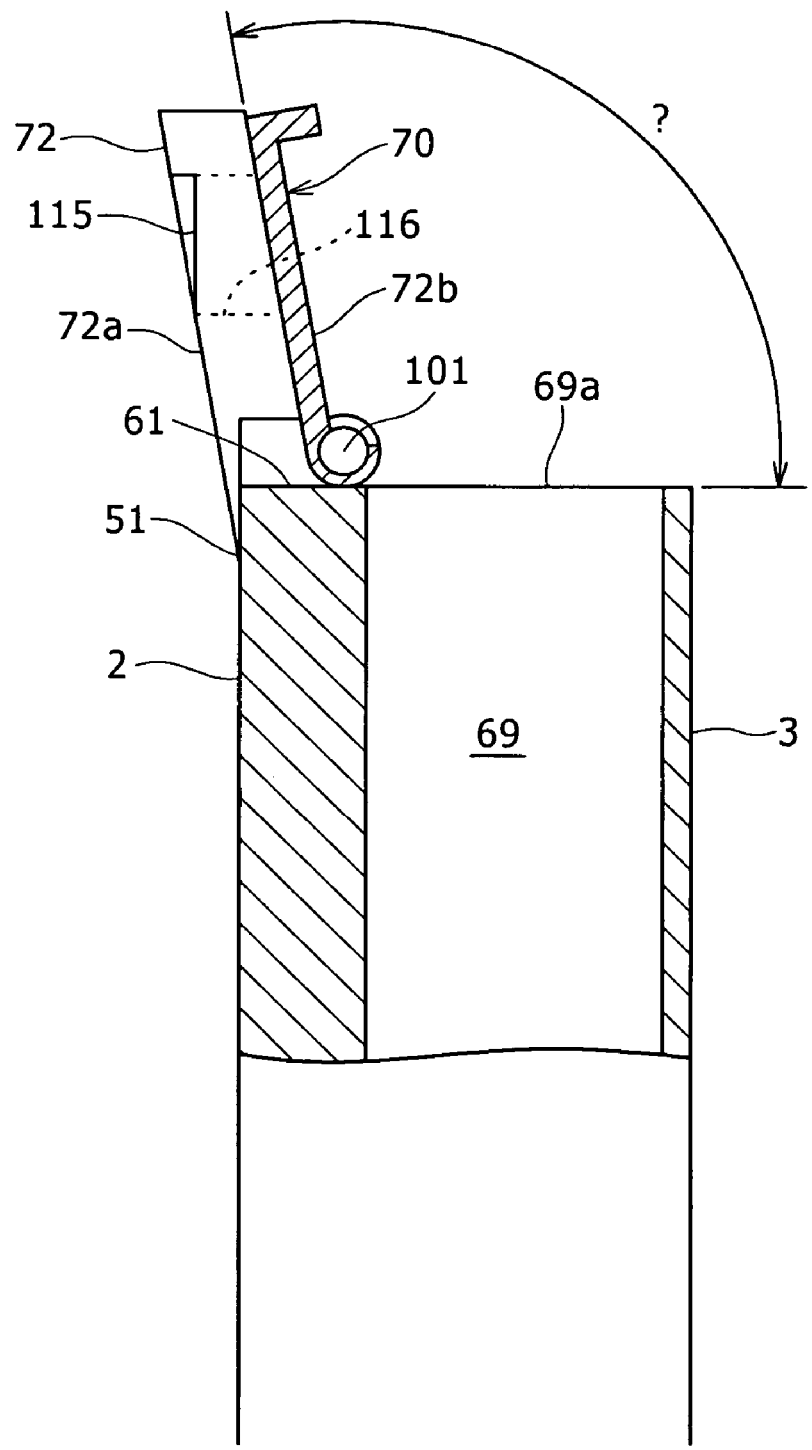
FIG. 31 is a side view of a strap fitting.

After the battery 111 is pushed out by the spring force of the spring for battery ejection 161, when the battery release lever 71 is moved to the battery 111, as shown in FIG. 30, a slope 111b provided in a frame 111a of the battery 111 is pushed by the slope-like battery pushing-out surface 106a in the top of the battery engagement portion 106 of the battery release lever 71, thereby the battery 111 is further pushed out from the battery accommodating section 69. The battery 111 may be pushed out from the battery accommodating section 69 by the spring force of the spring for battery ejection 161 in order to eliminate need of using the battery pushing-out surface 106a of the battery release lever 71 for pushing out the battery 111 from the battery accommodating section 69.

(5) Configuration of Cap of Memory Card Accommodating Section (Memory Card Cap)

Figure 36:
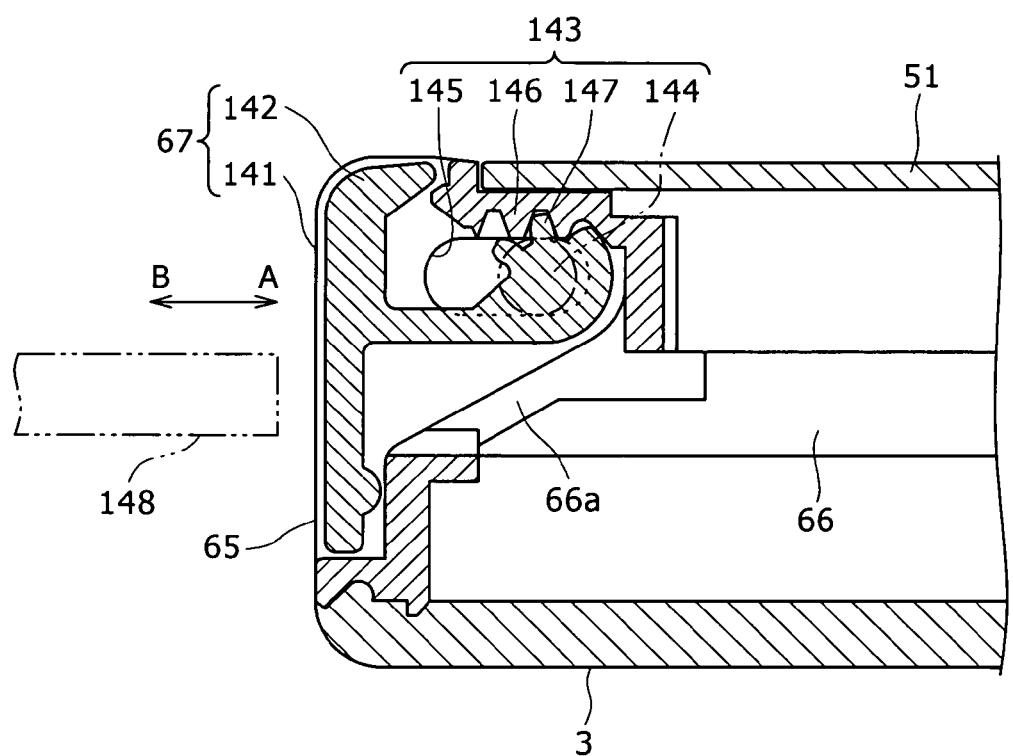
FIG. 36 is a cross section view of a cap rotation mechanism in a condition that a memory card cap is closed.
Figure 37:
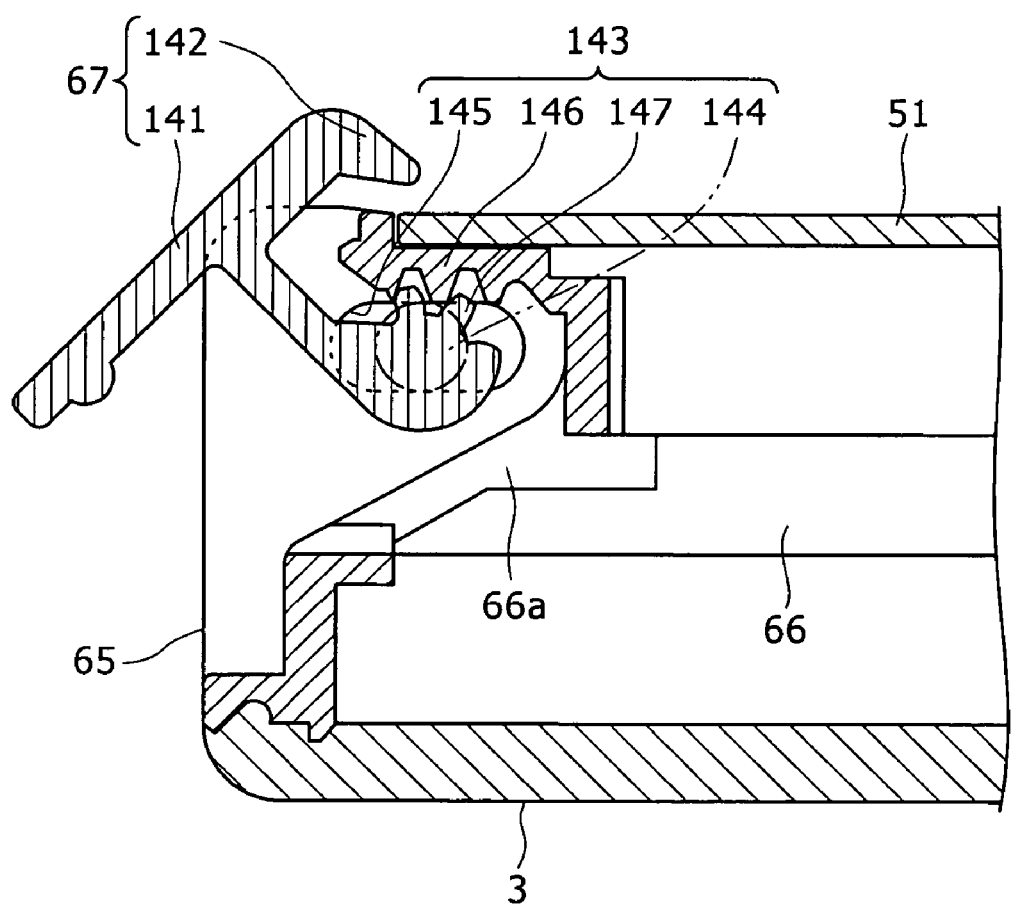
FIG. 37 is a cross section view of the cap rotation mechanism in a condition that the memory card cap is half opened.

The memory card cap 67 performs opening and closing the opening of the memory card accommodating section 66, and as shown in a cross section view of FIG. 36, includes an end-face overlap portion (cap body portion) 141 that overlaps in approximately the same level on the second end face (lower end face) 65 connecting between the first main surface 3 and the second main surface 51 in a condition that the cap is closed, and a main-surface overlap portion 142 that overlaps in approximately the same level on the second main surface 51.

Figure 38:
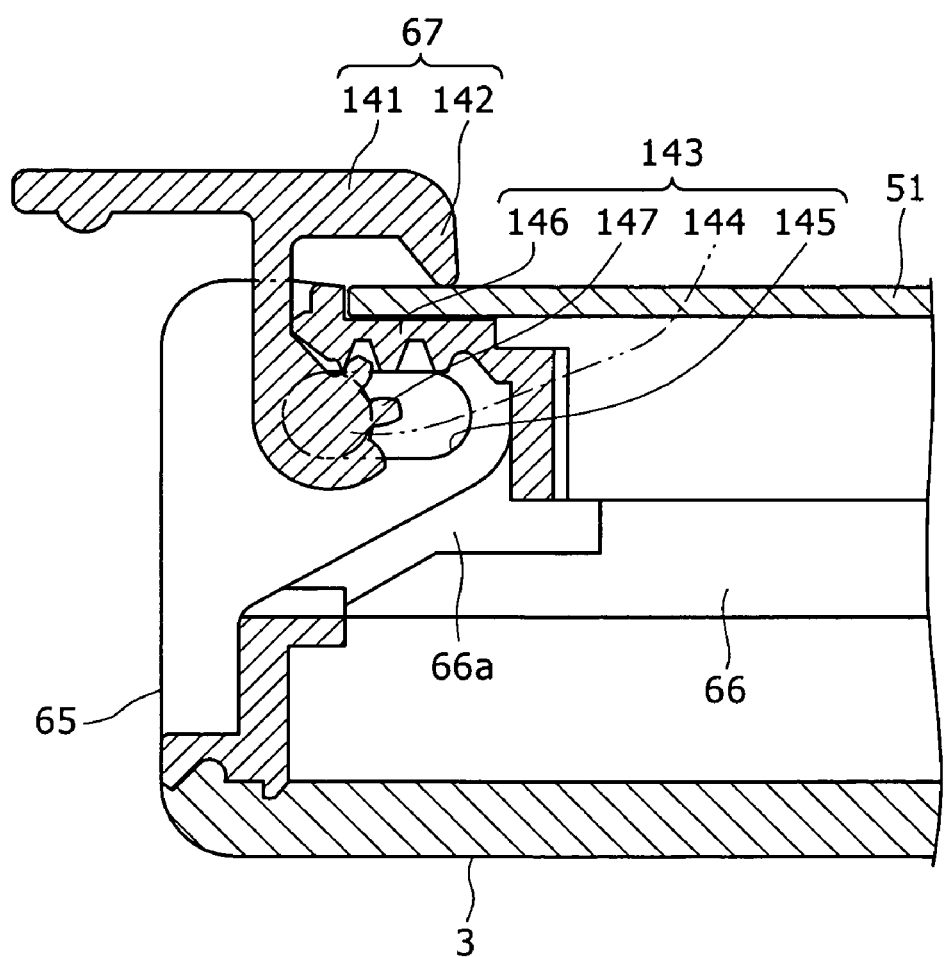
FIG. 38 is a cross section view of the cap rotation mechanism in a condition that the memory card cap is opened.

The memory card cap 67 is attached to the housing 2 using a cap rotation mechanism 143, and attached to the housing 2 rotatably between a first position where the opening 66a of the memory card accommodating section 66 is closed (FIG. 36) and a second position where the opening 66a is opened (FIG. 38).

The cap rotation mechanism 143 includes a rotation fulcrum shaft 144 of the memory card cap 67, a long-groove-shaped bearing 145 by which the rotation fulcrum shaft 144 is movably attached to the housing 2, and a rack 146 and a pinion 147 that move the rotation fulcrum shaft 144 along the long-groove-shaped bearing 145 by rotation of the rotation fulcrum shaft 144 along with opening and closing of the memory card cap 67.

The rotation fulcrum shaft 144 is provided in the memory card cap 67, and the long-groove-shaped bearing 145 is provided in the housing 2. The pinion 147 is provided on an outer circumferential face of the rotation fulcrum shaft 144, and the rack 146 is provided along a shaft movement direction of the long-groove-shaped bearing 145.

The long-groove-shaped bearing 145 is provided approximately parallel to an insertion direction A and an ejection direction B of the memory card 148 with respect to the memory card accommodating section 66; and when the memory card cap 67 is closed, the rotation fulcrum shaft 144 is moved within the long-groove-shaped bearing 145 in the insertion direction A of the memory card 148, and when the memory card cap 67 is opened, the rotation fulcrum shaft 144 is moved within the long-groove-shaped bearing 145 in the ejection direction B of the memory card 148.

Figure 39:
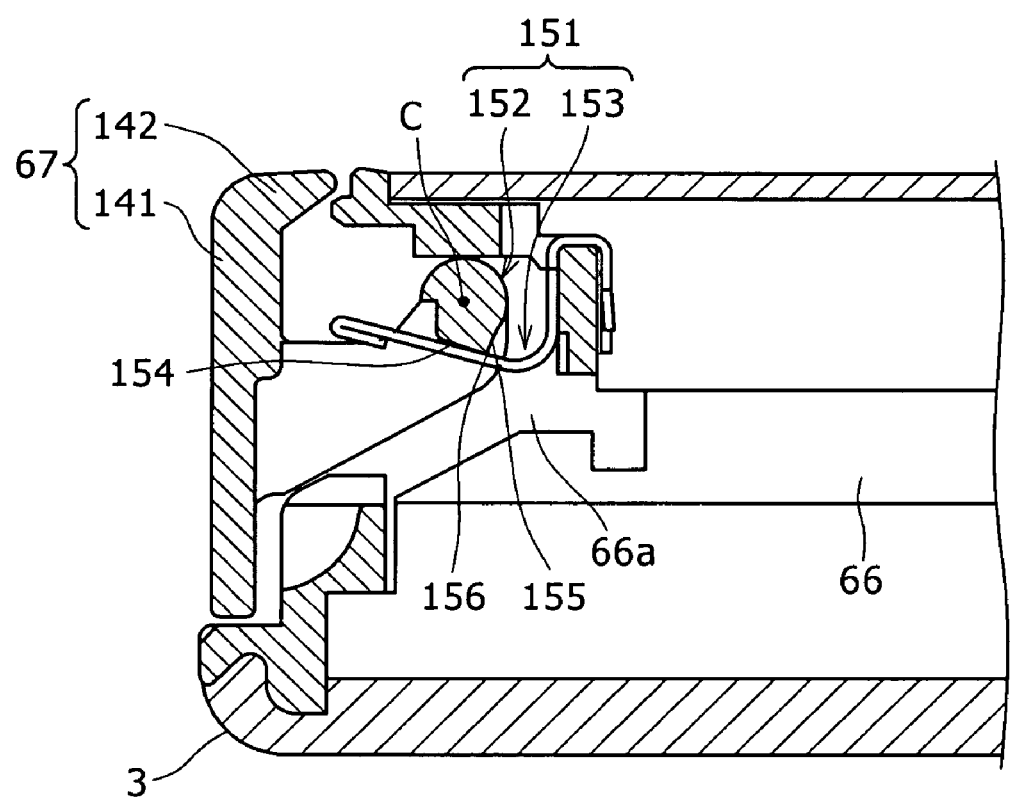
FIG. 39 is a cross section view of a click mechanism in a condition that the memory card cap is closed.
Figure 40:
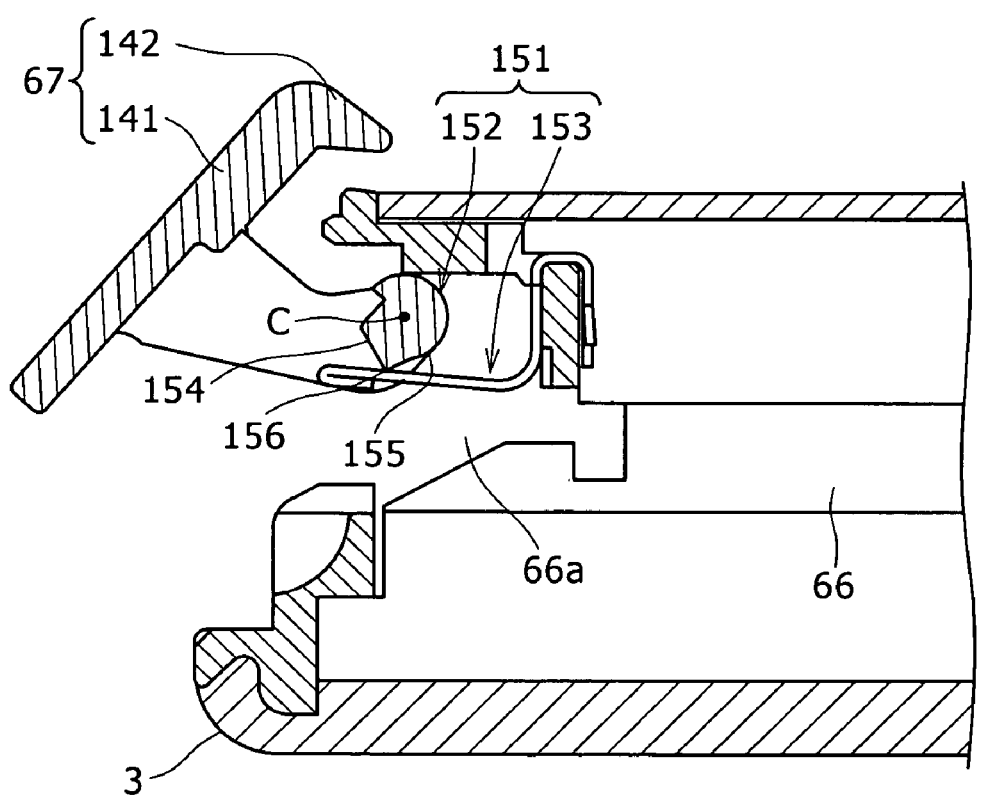
FIG. 40 is a cross section view of the click mechanism in a condition that the memory card cap is half opened.
Figure 41:
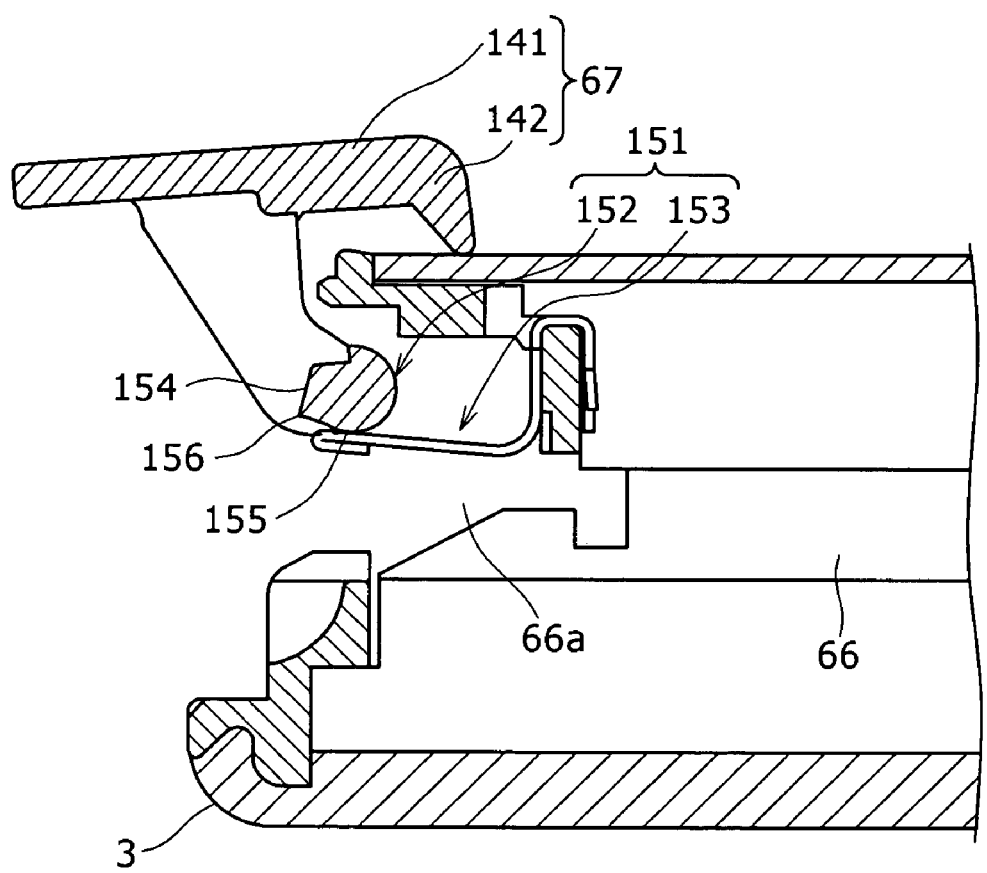
FIG. 41 is a cross section view of the click mechanism in a condition that the memory card cap is opened.

As shown in FIG. 39, a click mechanism 151 is provided for pressing the rotation fulcrum shaft 144 to an end side of the long-groove-shaped bearing 145 in the insertion direction A of the memory card 148 when the memory card cap 67 is closed (FIG. 36), and for pressing the rotation fulcrum shaft 144 to an end side of the long-groove-shaped bearing 145 in the ejection direction B of the memory card 148 when the memory card cap 67 is opened (FIG. 38).

The click mechanism 151 is configured of a click shaft 152 that is provided on the memory card cap 67 and rotated with rotation of the memory card cap 67, and a spring member (flat spring) 153 that is provided on the housing 2 and in contact with a circumferential face of the click shaft 152. On a circumferential face of the click shaft 152, a first spring contact surface 154 for generating a biasing force in a direction of pressing the rotation fulcrum shaft 144 to the end side of the long-groove-shaped bearing 145 in the insertion direction A of the memory card 148 by the spring member 153, and a second spring contact surface 155 for generating a biasing force in a direction of pressing the rotation fulcrum shaft 144 to the end side of the long-groove-shaped bearing 145 in the discharge direction B of the memory card 148 are continuously provided in a rotation direction of the click shaft 152.

Figure 42:
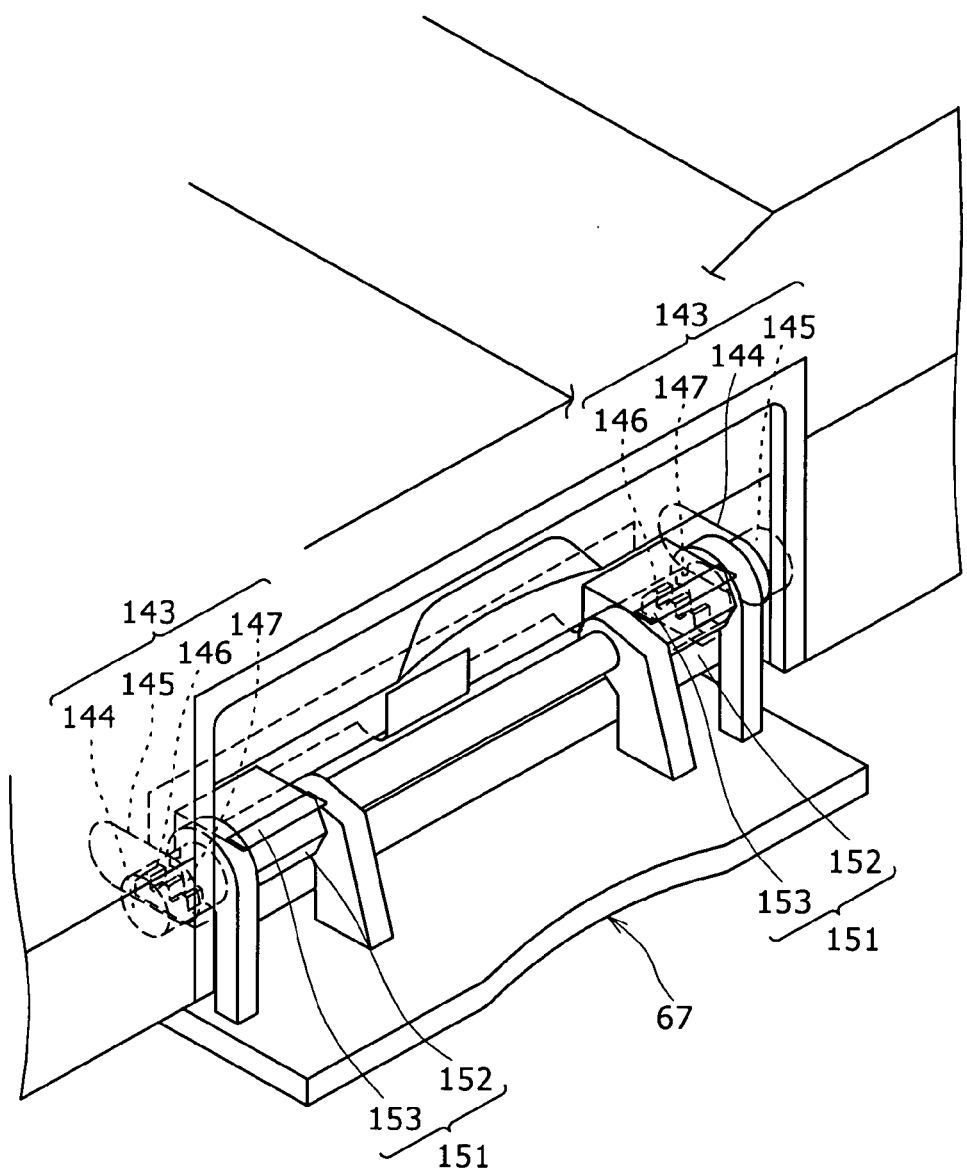
FIG. 42 is a perspective view of the condition that the memory card cap is opened.
Figure 43:
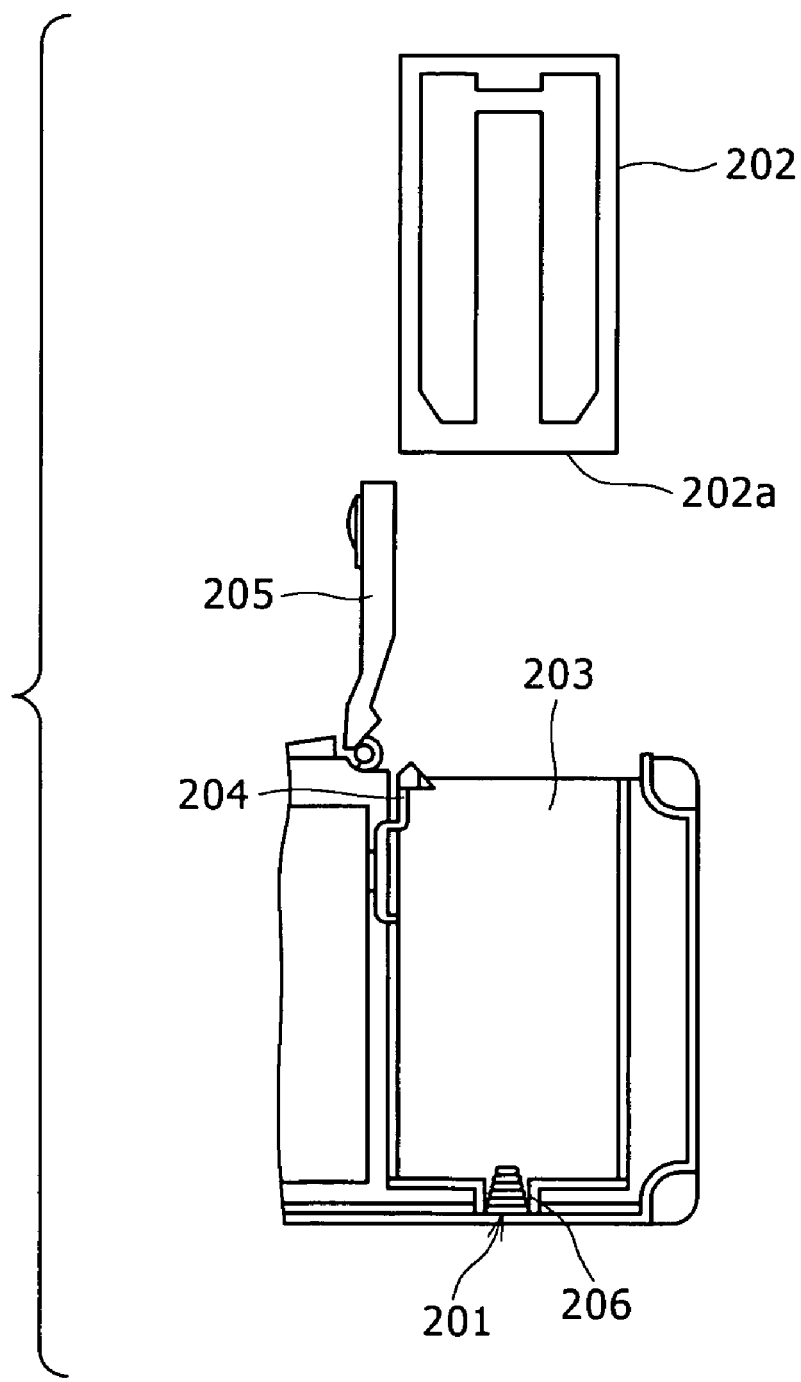
FIG. 43 is an illustrative view of an example in the related art.
Figure 44:
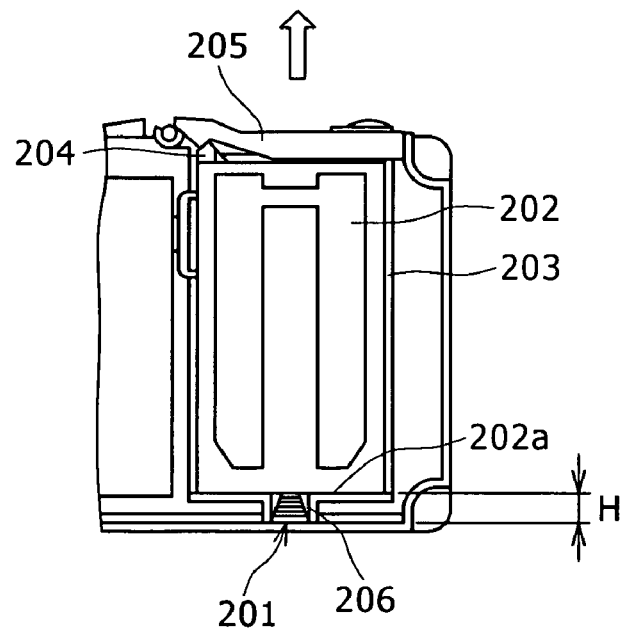
FIG. 44 is an illustrative view of the example in the related art.
Figure 45:
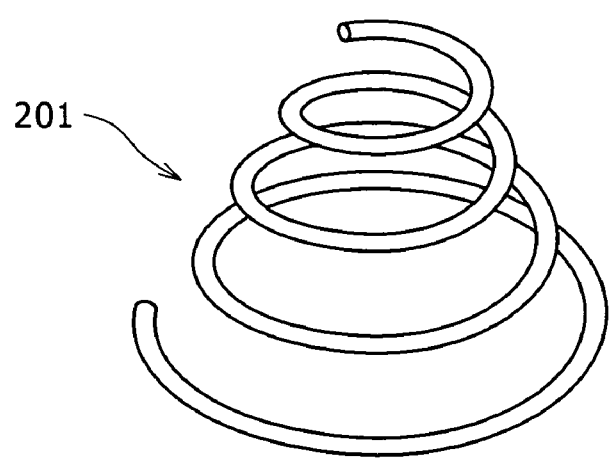
FIG. 45 is an illustrative view of another example in the related art.
Figure 46:
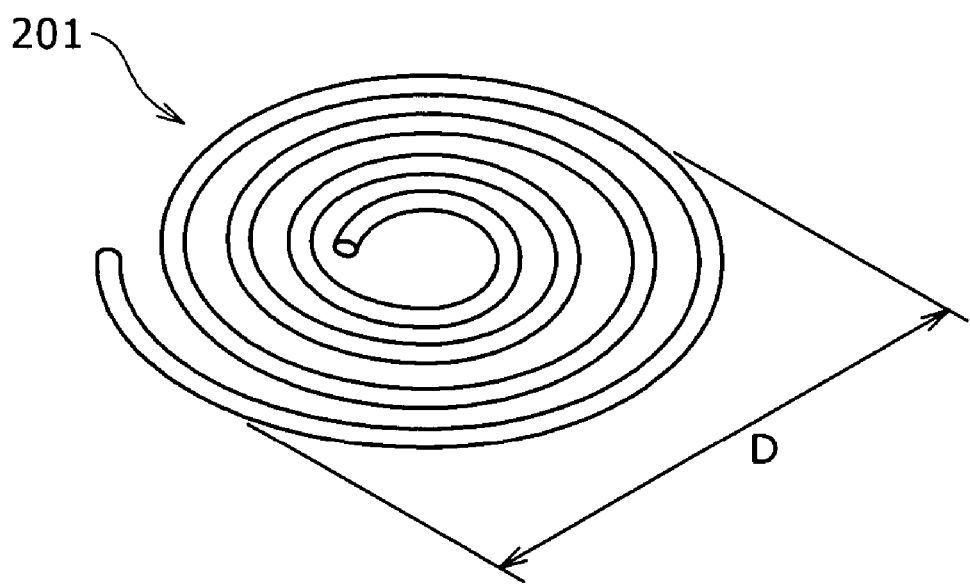
FIG. 46 is an illustrative view of another example in the related art.

A boundary portion 156 between the first spring contact surface 154 and the second spring contact surface 155 is a so-called neutral position which does not allow the spring member 153 to generate the force for rotating the click shaft 152. A radial distance from a rotation axis C of the click shaft 152 to the boundary portion 156 is set larger than radial distances from the rotation axis C of the click shaft 152 to first and second spring contact surfaces 154, 155. FIG. 42 is a perspective view of a condition where the memory card cap 67 is opened; wherein the cap rotation mechanisms 143 are disposed in pair at both sides of the memory card cap 67, and the click mechanism 151 are disposed in pair inside the cap rotation mechanism 143.

The memory card cap 67 of the embodiment is in a configuration as described above, and an outer surface of the memory card cap 67 has approximately the same level as that of an outer surface of the housing 2 in a condition that the cap is closed, as shown in FIG. 36. When the memory card cap 67 is opened, the cap 67 gradually projects from the housing 2, and in a fully opened condition, as shown in FIG. 38, the memory card cap 67 projects from the second main surface 51 of the housing 2 only by height of the main surface overlap portion 142, and the end face overlap portion (cap body portion) 141 becomes parallel to the second main surface 51.

(6) Configuration of Housing

Figure 16:
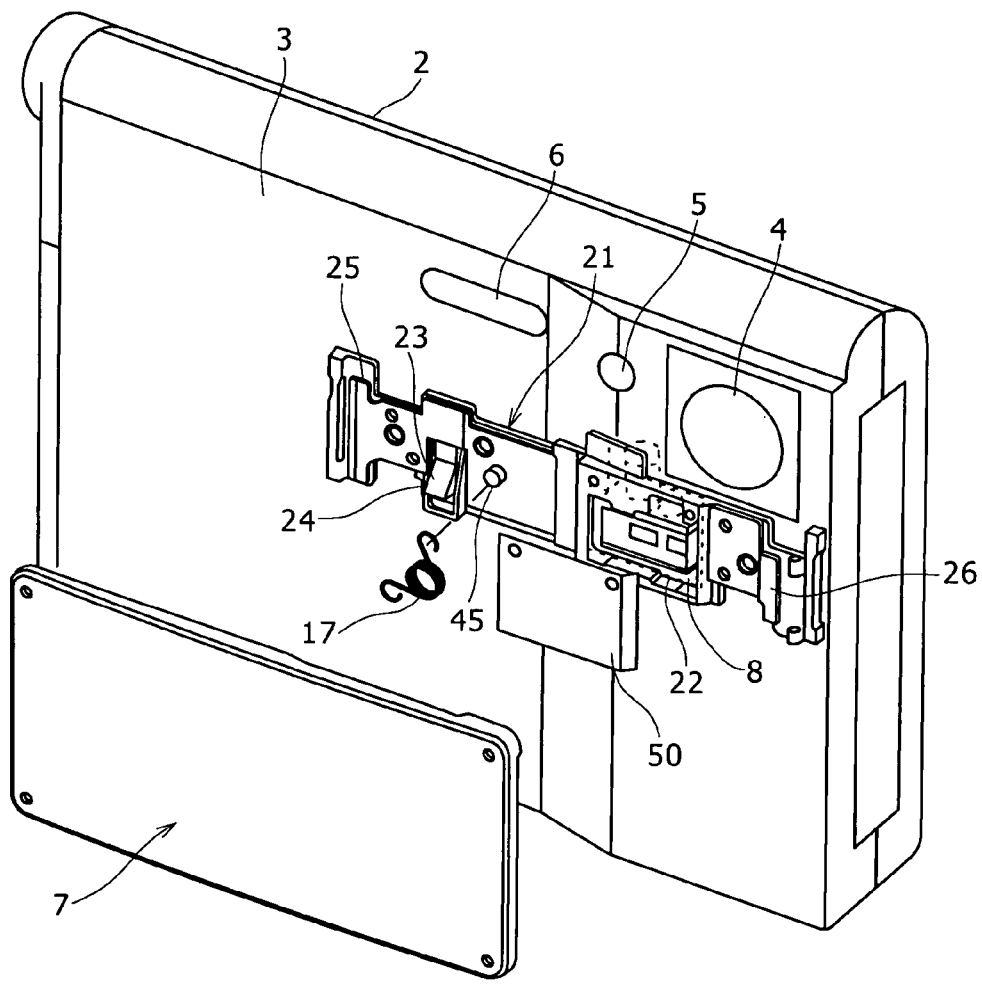
FIG. 16 is a perspective view of a condition where the barrier is removed.

FIG. 16 shows a condition where the barrier 7 is removed, wherein the image pickup lens 4 is disposed facing on a corner at an upper end side of the first main surface 3 of the flat, rectangular housing 2, and the AF illuminator 5 and the light emitter for flash 6 are disposed at a side of the image pickup lens 4.

A base plate 21 is attached to a portion below the image pickup lens 4, AF illuminator 5, and light emitter for flash 6. A first opening 22 is provided in the base plate 21, and part of the iris drive mechanism 8 is received in the first opening 22. In addition, a second opening 23 is provided in the base plate 21, and a switch operation member 24, which is for operating a barrier position detection switch (omitted to be shown) provided within the housing 2 for detecting whether the barrier 7 lies in the first position or in the second position, is disposed in the second opening 23. Moreover, on both sides of the base plate 21, a pair of first and second barrier engagement members 25, 26 forming the first and second barrier slide guide portions 15, 16 are provided.

Figure 17:
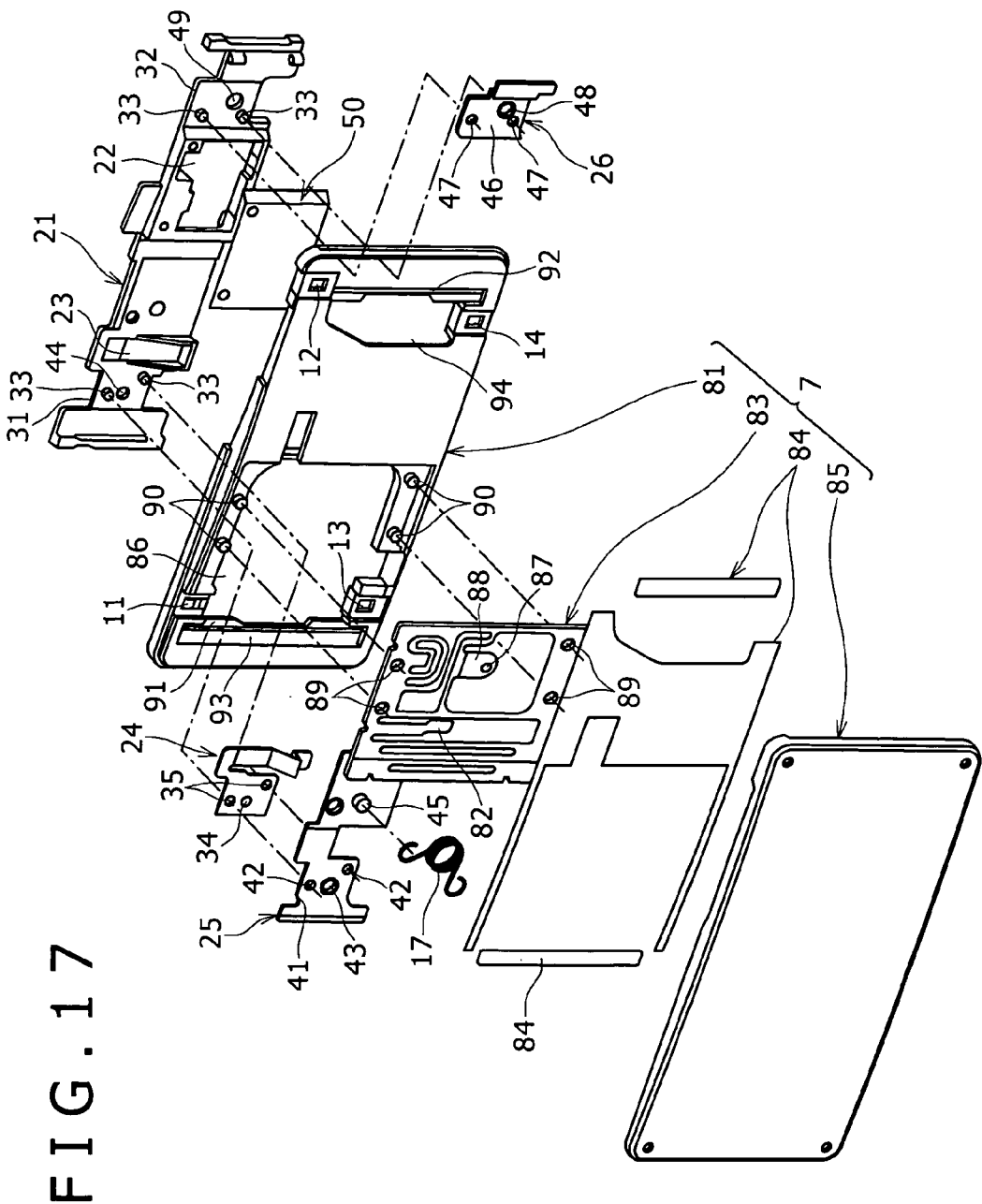
FIG. 17 is an exploded, perspective view of the barrier.

As shown in an exploded, perspective view of FIG. 17, on the base plate 21, first and second barrier-engagement-member attachment-portions 31, 32 for attaching the first and second barrier engagement members 25, 26 are provided on both sides of the first and second openings 22, 23. A plurality of bosses 33 are provided on the first and second barrier-engagement-member attachment-portions 31, 32.

The switch operation member 24 is formed by folding a flat spring into an approximate L-shape. An attachment base 34 for attaching the member 24 to the base plate 23 is provided on a side of the switch operation member 24. A plurality of boss insertion holes 35 into which the bosses 33 provided in the first barrier-engagement-member attachment-portion 31 are provided in the attachment base 34.

The switch operation member 24 is attached to the first barrier-engagement-member attachment-portion 31 by inserting the plurality of bosses 33 into the boss insertion holes 35 provided in the attachment base 34 while the member 24 is inserted in the second opening 23.

The first barrier engagement member 25 is formed by folding a metal sheet. An attachment base 41 for attaching the first barrier engagement member 25 to the base plate 21 is provided on a side of the first barrier engagement member 25. A plurality of boss insertion holes 42 into which the bosses 33 provided on the first barrier-engagement-member attachment-portion 31 are provided in the attachment base 41.

As described before, the bosses 33 provided on the first barrier-engagement-member attachment-portion 31 are inserted into the boss insertion holes 35 provided in the attachment base 34 for the first barrier-engagement-member attachment-portion 31, and then the bosses 33 are inserted into the both insertion holes 42 provided in the attachment base 41, and then tips of the bosses 33 are subjected to so-called caulking for diameter expansion, thereby the first barrier engagement member 25 is attached to the first barrier engagement member attachment portion 31 while pinching the attachment base 34 for the switch operation member 26 to the first main surface 3 of the housing 2. A plurality of positioning bosses 43 are provided on the attachment base 41 of the first barrier engagement member 25.

When the first barrier engagement member 25 is attached to the first barrier engagement member attachment portion 31, the positioning bosses 43 are fitted in boss insertion holes 44 provided in the base plate 23 for positioning the first barrier engagement member 25. A first spring latch portion 45 that latches an end of the toggle spring 17 is provided on the attachment base 41 of the first barrier engagement member 25.

The second barrier engagement member 26 is formed by folding a metal sheet similarly as the first barrier engagement member 25. An attachment base 46 for attaching the second barrier engagement member 26 to the base plate 23 is provided on a side of the second barrier engagement member 26. A plurality of boss insertion holes 47 into which the bosses 33 provided on the second barrier-engagement-member attachment-portion 32 are provided in the attachment base 46.

The bosses 33 provided on the second barrier-engagement-member attachment-portion 32 are inserted into the boss insertion holes 47 provided in the attachment base 46, and then tips of the bosses 33 are subjected to the so-called caulking for diameter expansion, thereby the second barrier engagement member 26 is attached to the second barrier-engagement-member attachment-portion 32. Positioning bosses 48 are provided on the attachment base 46 of the second barrier engagement member 26. When the second barrier engagement member 26 is attached to the second barrier-engagement-member attachment-portion 32, the positioning bosses 48 are fitted in positioning boss insertion holes 49 provided in the second barrier-engagement-member attachment-portion 32 for positioning the second barrier engagement member 26. The first opening 22 provided in the base plate 21 is closed by an iris cover sheet 50 in order to prevent entering of dust and the like into the housing 2 through the first opening 22. As shown in FIG. 2A, on the second main surface 51 facing the first main surface 3 of the housing 2, a display 52 such as liquid crystal display, mode change switch 53, menu button 54, control button 55, screen display on-off button 56, and speaker 57 are provided. Moreover, on a first end face (upper end face) 61 connecting between the first main surface 3 and the second main surface 51, a microphone 62, zoom button 63 and shutter button 64 are provided.

(7) Configuration of Barrier

As shown in FIG. 17, the barrier 7 is configured of a flame-like inside member 81, a metal sheet 83 that is attached to the flame-like inside member 81 and provided with a switch-operation-member press portion 82 for operationally pressing the switch operation member 26, and an outside member 85 attached to an outer surface of the inside member 81 attached with the metal sheet 83 using an adhesive double coated sheet 84 and the like.

An approximately square cutout window 86 is provided in the inner member 81, and the metal sheet 83 is attached facing the cutout window 86. In the metal sheet 83, the switch-operation-member press portion 82 is formed by cutting and raising, and a tongue 88 having a second spring latch portion 87, which latches the other end of the toggle spring 17 latched at one end by the first spring latch portion 45 provided on the attachment base 41 of the first barrier engagement member 25, is formed by cutting and raising.

A plurality of boss insertion holes 89 are provided in the periphery of the metal sheet 83, and bosses 90 provided on the periphery of the cutout window 86 of the inner member 81 are inserted into the holes 89, and then tips of the bosses 90 are subjected to caulking for diameter expansion, thereby the metal sheet 83 is attached to the inner member 81.

First to fourth rollers 11 to 14 which are contacted to the first main surface 3 of the housing 2 are disposed at four corners of the inner member 81, and the rail-like, first and second barrier-engagement-member engagement-portions 91, 92 with which the first and second barrier engagement members 25, 26 attached to the base plate 21 are engaged for movement are provided on both sides in a movement direction.

The first barrier-engagement-member engagement-portion 91 is formed along a side of a first long hole 93 formed in a side of the inner member 81. The second barrier-engagement-member engagement-portion 92 is formed along a side of a second long hole 94 formed in a side of the inner member 81. The first and second barrier slide guide portions 15, 16 are configured of the first and second barrier engagement members 27, 28 and the rail-like, first and second barrier-engagement-member engagement-portions 91, 92.

(8) Configuration of Roller

Figure 18:
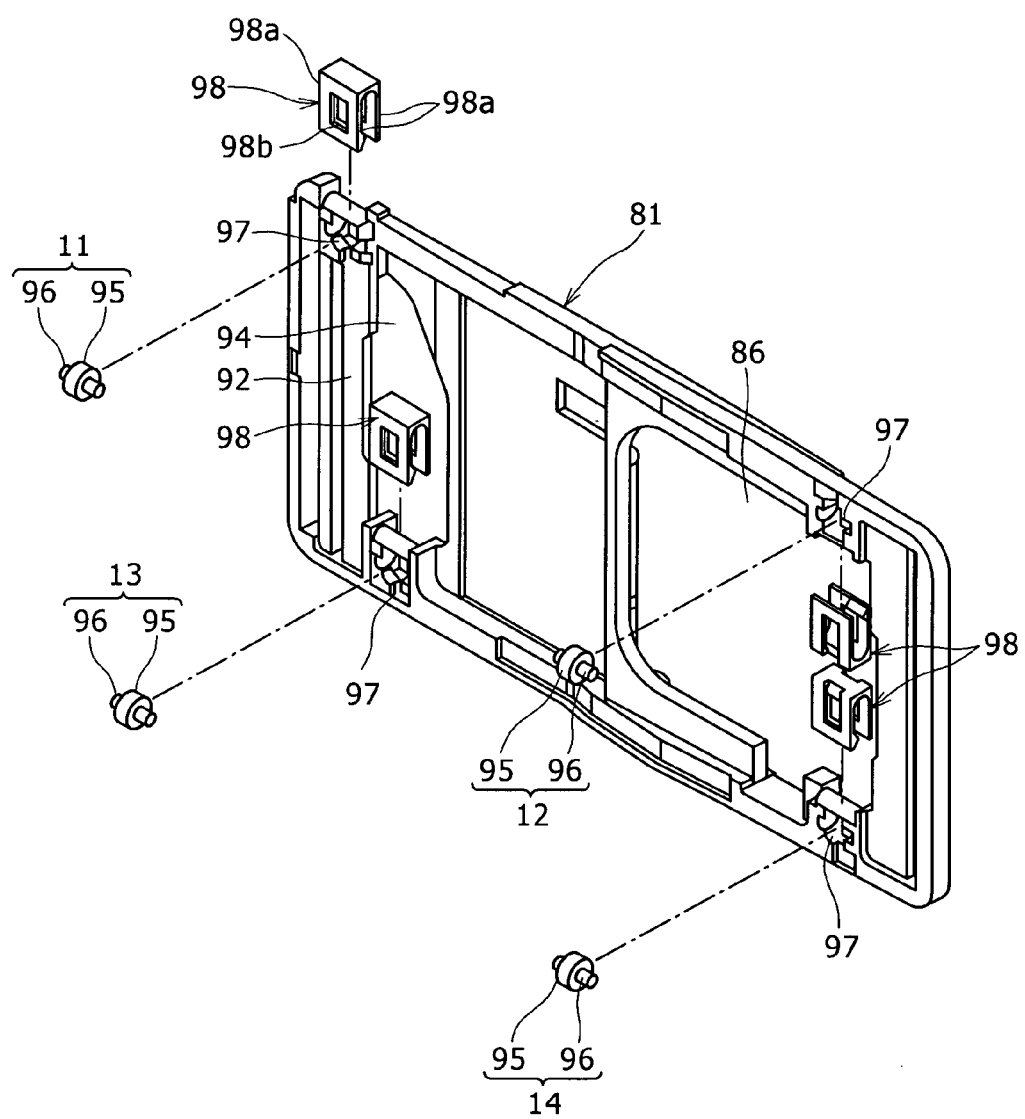
FIG. 18 is a perspective view showing attachment of rollers.

As shown in FIG. 18, the first to fourth rollers 11 to 14 include disk-shaped roller bodies 95 and rotation center axes 96 projected from both sides of the roller bodies 95. The first to fourth rollers 11 to 14 are received in the first to fourth roller receivers 97 provided at four corners of the inner member 81, and rotatable with the rotation center axes 96 as centers.

U-shaped clips 98 are attached laterally to the first to fourth roller receivers 97 in which the first to fourth rollers 11 to 14 are rotatably received, so that the first to fourth rollers 11 to 14 are prevented from falling off from the first to fourth roller receivers 97. Cutout windows 98b are provided in a pair of opposed sides 98a of the approximately U-shaped clip 98, and the disk-shaped roller body 95 partially projects from the cutout windows.

When the inner member 81 is overlapped with the first main surface 3 of the housing 2, the first to fourth rollers 11 to 14 are contacted to the first main surface 3 of the housing 2.

(9) Configuration of Barrier Slide Guide Portion

Figure 19A:
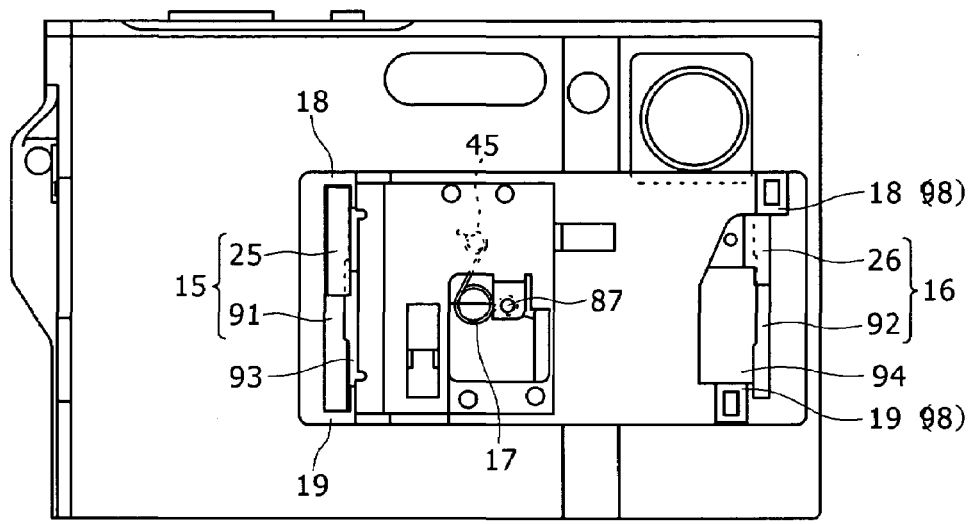
FIG. 19A is an illustrative view showing operation of a toggle spring.
Figure 19B:
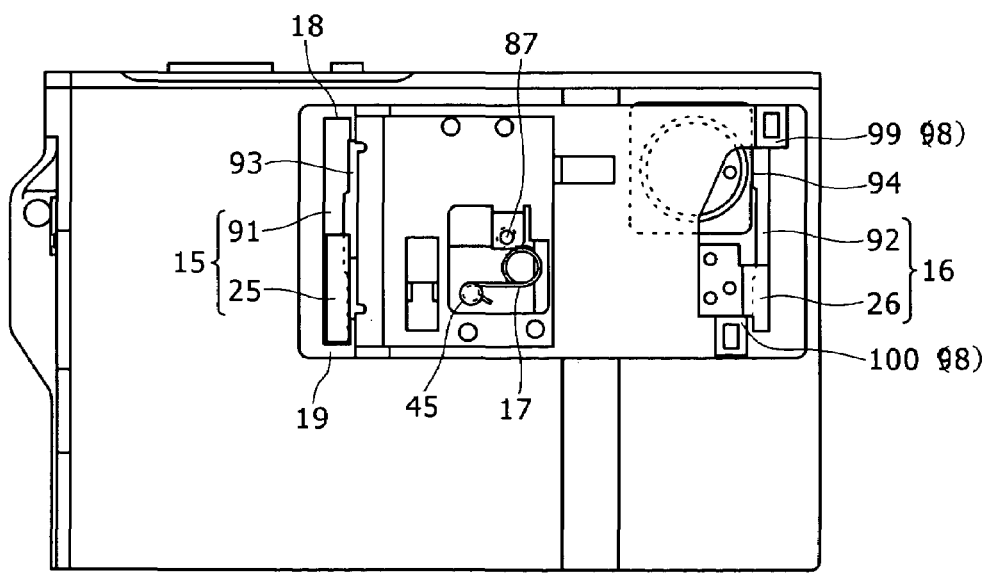
FIG. 19B is an illustrative view showing operation of the toggle spring.

The barrier slide guide portion literally guides movement of the barrier 7, and as shown in FIG. 19A to FIG. 19B, the first barrier slide guide portion 15 is disposed at one side of the barrier 7, and the second barrier slide guide portion 16 is disposed at the other side.

The first barrier slide guide portion 15 is configured by engaging the first barrier engagement member 25 provided on the housing 2 with the rail-like, first barrier-engagement-member engagement-portion 91. The second barrier slide guide portion 16 is configured by engaging the second barrier engagement member 26 provided on the housing 2 with the rail-like, second barrier-engagement-member engagement-portion 92.

The first barrier-engagement-member engagement-portion 91 is engaged with the first barrier engagement member 25 in an overlapped condition via the first long hole 93 formed at one side of the inner member 81, and thus lightly presses the first to fourth rollers 11 to 14 to the main surface 3 of the housing 2. The second barrier-engagement-member engagement-portion 92 is engaged with the second barrier engagement member 28 in an overlapped condition via the second long hole 94 formed at the other side of the inner member 81, and thus lightly presses the first to fourth rollers 11 to 14 to the main surface 3 of the housing 2. The barrier 7 is moved between the first position where the image pickup lens is exposed and the second position where the image pickup lens is masked along one ends of the first and second long holes 93, 94.

As shown in FIG. 19A, first stoppers 18 are provided at sides of one longitudinal ends of the rail-like, first and second barrier-engagement-member engagement-portions 91, 92, and when the barrier 7 is moved to the first position, the first stoppers 18 are contacted to the first and second barrier engagement members 25, 26 to prevent further movement. As shown in FIG. 19B, second stoppers 19 are provided at sides of the other longitudinal ends of the first and second long holes 93, 94, and when the barrier 7 is moved to the second position, they are contacted to the first and second barrier engagement members 25, 26 to prevent further movement. The first and second stopper portions 18 and 19 of the second barrier-engagement-member engagement-portion 92 are configured of the approximately U-shaped clip 98 that prevents the second and fourth rollers 12, 14 from falling off from the first to fourth roller receivers 97.

(10) Configuration of Toggle Spring

When the barrier 7 lies in the first position, the toggle spring 17 presses the first stopper portions 18 to the first and second barrier engagement members 25, 26 to keep the barrier 7 open; and when the barrier 7 lies in the second position, it presses the second stopper portions 19 to the first and second barrier engagement members 25, 26 to keep the barrier 7 close.

Figure 20:
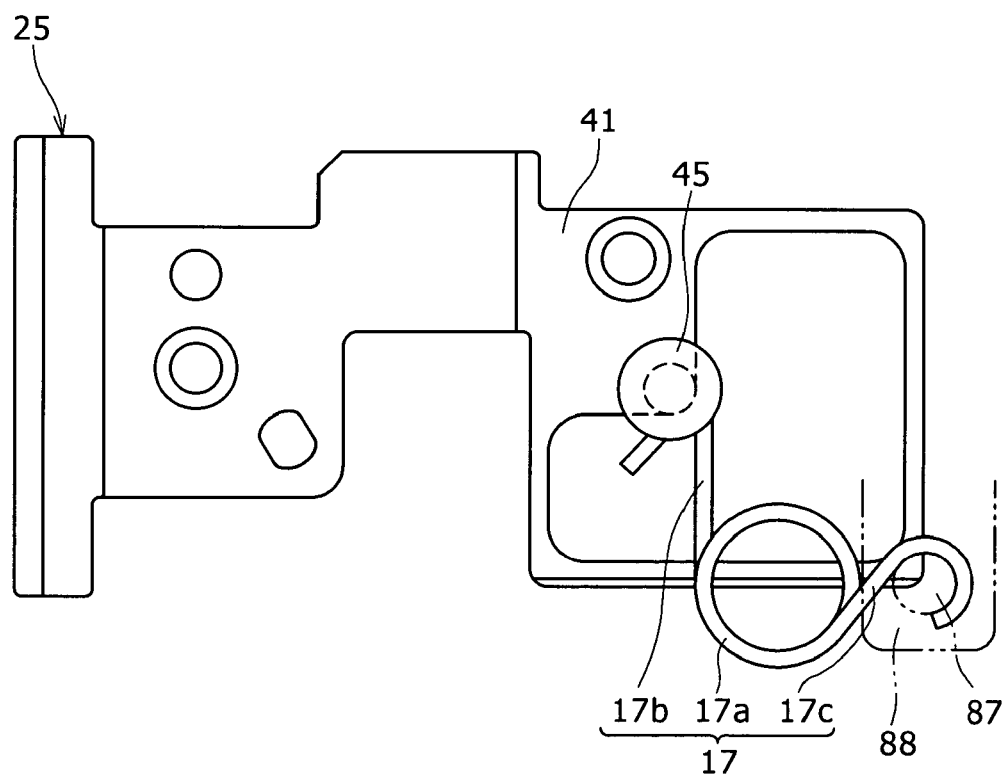
FIG. 20 is an illustrative view of the toggle spring.

As shown in FIG. 20, a so-called torsion coil spring is used as the toggle spring 17, which includes a coil portion 17a, first arm portion 17b extending from one end of the coil portion 17a, and second arm portion 17c extending from the other end of the coil portion 17a.

The first arm portion 17b of the toggle spring 17 is rotatably latched by the first spring latch 45 provided on the attachment base 41 for the first barrier engagement member 25. The second arm portion 17c of the toggle spring 17 is rotatably latched by the second spring latch 87 provided on the tongue 88 of the metal sheet 83 (refer to FIG. 17) attached to the inner member 81.

When the barrier 7 lies in the first position, the toggle spring 17 presses the first stopper portions 18 to the first and second barrier engagement members 25, 26 to keep the barrier 7 open, as shown in FIG. 19A. As the barrier 7 is moved from the first position to the second position, the coil portion 17a of the toggle spring 17 is rotated (reverse turn), and when the barrier 7 is moved to a certain position, an action direction of the spring force of the toggle spring 17 is reversed, and as shown in FIG. 19B, the toggle spring 17 presses the second stopper portions 19 to the first and second barrier engagement members 25, 26 to keep the barrier 7 close.

(11) Configuration of Strap Fitting

The strap fitting 72 is a fitting for attaching a wrist strap for a wrist or a neck strap worn around the neck and the like for safety, which also acts to facilitate holding of the housing 2 by touching the thumb to the fitting during image pickup.

As shown in FIG. 2 and FIG. 21, the strap fitting 72 is formed in a condition of being stood along a side edge at a side of the second main surface 51 of the end face 61 of the housing 2, and a second surface 72b at a side opposite to a first surface 72a at the side of the second main surface 51 forms a receiving surface of the battery cap 70. The second surface 72b is formed with an inclination angle θ that is more than 90 degrees with respect to the end face 61 of the housing 2 or the opening 69a of the battery accommodating section 69. On the first surface 72a, a groove-like engaging portion 115 is provided such that when the following multiple connector 121 is connected to the multiple connector connection terminal 73, the multiple connector 121 does not fall out from the multiple connector connection terminal 73, the engaging portion 115 being engaged with an engagement portion 127 of a multiple connector 121. The strap fitting 72 has a hole 116 for attaching the strap.

Figure 32:
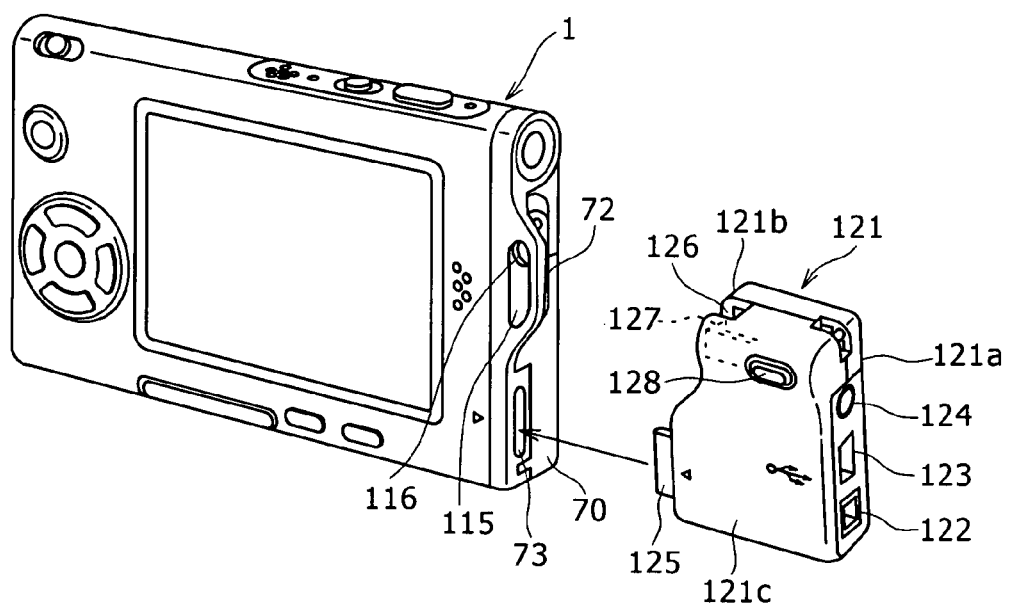
FIG. 32 is a perspective view before a multiple connector is attached to the camera.

FIG. 32 shows the multiple connector 121 to be connected to the multiple connector connection terminal 73. The multiple connector 121 includes a DC input terminal 122, a USV terminal 123, and an A/V output terminal 124 on a first side face 121a; includes a terminal 125 to be inserted into the multiple connector connection terminal 73, and a strap fitting insertion recess 126 into which the strap fitting 72 is inserted on a second side face 121b; includes the engagement portion 127 to be engaged with a groove-like engaging portion 115 of the strap fitting 72 facing an inner face of the strap fitting insertion recess 126; and includes a disengagement button 128 for disengagement operation from the engaging portion 115 of the engagement portion 127 on a third side face 121c.

Figure 33:
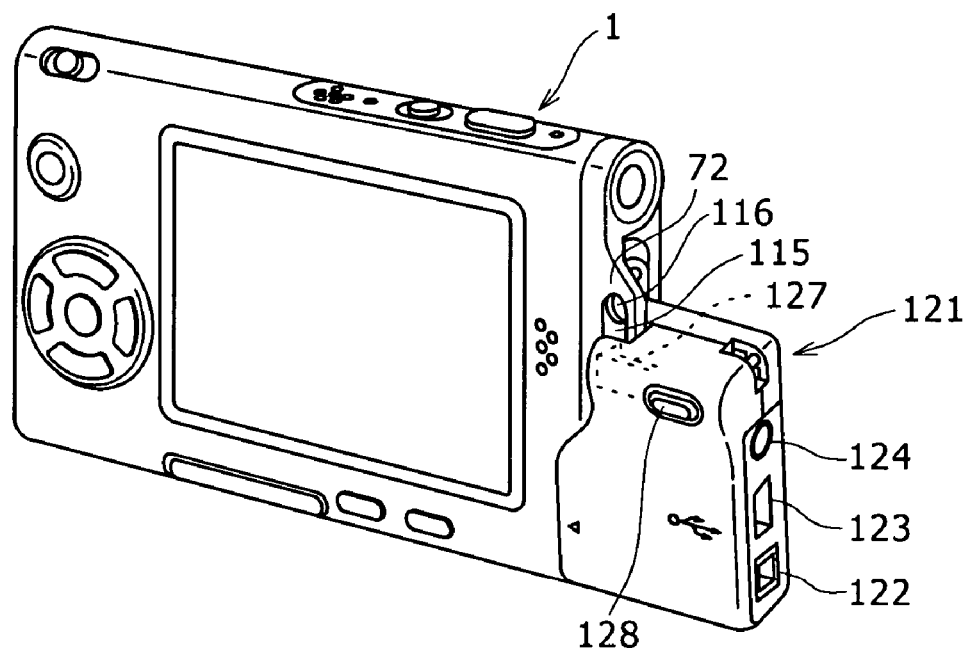
FIG. 33 is a perspective view of a condition where the multiple connector has been attached to the camera.

When the terminal 125 is inserted into the multiple connector connection terminal 73 just from a side as shown in FIG. 32, the strap fitting 72 is inserted of itself into the strap fitting insertion recess 126, and the engagement portion 127 is engaged with the engaging portion 115, thereby the multiple connector 121 is locked on a camera 1 side, as shown in FIG. 33.

Figure 34:
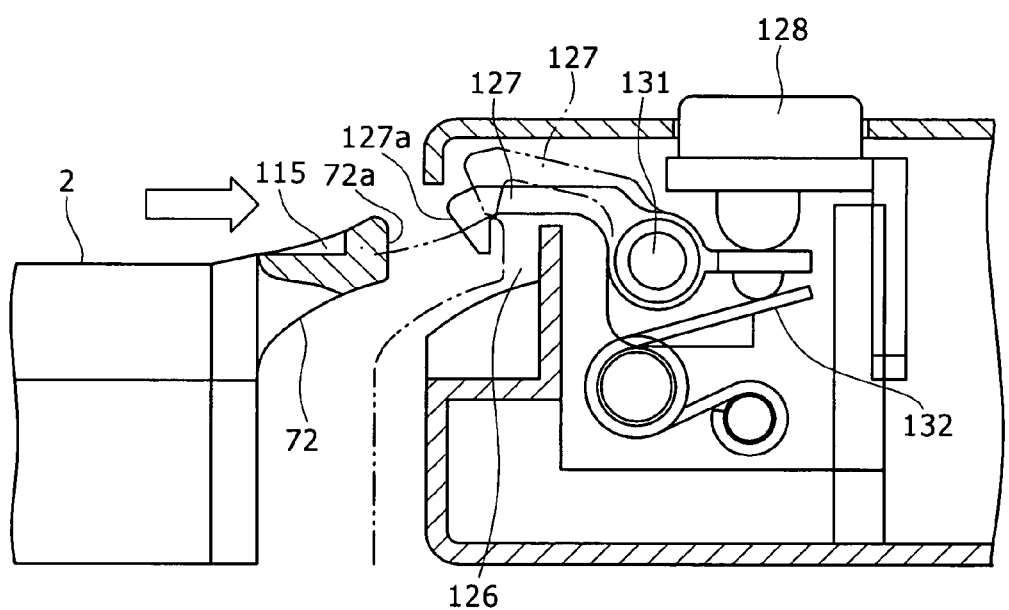
FIG. 34 is a cross section view of a condition where the multiple connector is locked on the strap fitting.

FIG. 34 is a partial section view of the multiple connector 121. The nail-like engagement portion 127 is made rotatable with a shaft 131 as a center, and protruded into the strap fitting insertion recess 126 by a spring 132. When the strap fitting 72 is inserted into the strap fitting insertion recess 126, a slope 127a at a front end of the engagement portion 127 is pushed by the front end face 72a of the strap fitting 72, and thus the engagement portion 127 is rotated in a runout direction against biasing force of the spring 132. When the strap fitting 72 is completely inserted into the strap fitting insertion recess 126, and the slope 127a at the front end of the engagement portion 127 is released from being pressed by the front end face 72a of the strap fitting 72, the engagement portion 127 is automatically rotated by the biasing force of the spring 129, and consequently engaged with the groove-like engaging portion 115.

Figure 35:
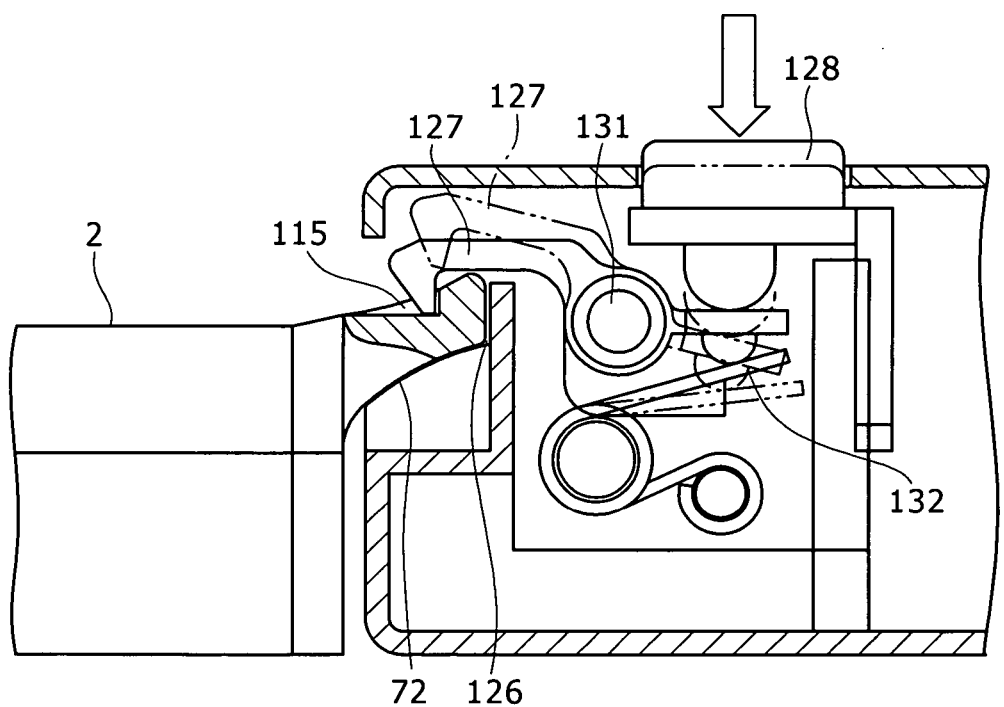
FIG. 35 is a cross section view of a condition where lock is released.

In the case that the multiple connector 121 is detached from the camera 1, when the disengagement button 128 is pressed, as shown in FIG. 35, the engagement portion 127 is rotated in the runout direction against biasing force of the spring 129, thereby disengaged from the groove-like engaging portion 115 and thereby becomes detachable from the camera 1.

As described above, since the electronic instrument is configured in such a way that the multiple connector 121 is engaged with the strap fitting 72, an advantageous effect is provided compared with a typical instrument having a structure where the multiple connector is not engaged with the strap fitting: even if strong force is exerted on the instrument, for example, due to a cord of the multiple connector 121 that is pulled, the force is not directly exerted on the connector connection portion, consequently connectors or terminals can be protected.

While FIG. 1, FIG. 2 and the like are stereographs of the image pickup device, FIG. 17 to FIG. 31 and the like are drawings of respective portions of the image pickup device in planar view, and even if slight difference exists in radius of curvature or inclination angle on a curved surface, slope, cylindrical surface and the like, it is a graphical matter and portions having the same references represent the same portions. Moreover, even if slight difference exists in radius of curvature or inclination angle on a curved surface, slope, cylindrical surface and the like between the stereographs of the image pickup device of FIG. 1, FIG. 2 and the like and stereographs of the image pickup device shown in FIG. 21, FIG. 22 and the like, it is also a graphical matter. Moreover, hatching lines were partially omitted in cross section views.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic instrument comprising,
a housing,
a battery accommodating section provided in the housing, and
a spring for battery ejection which is pressed by a battery inserted into the battery accommodating section and thus stored in power, wherein
the spring for battery ejection including,
a spring force generation portion,
a first arm portion provided at one end of the spring force generation portion, a second arm portion that is provided at the other end of the spring force generation portion and extends with a certain opening angle with respect to the first arm portion, a first shaft portion provided at an end of the first arm portion, and a second shaft portion provided at an end of the second arm portion, and the first shaft portion is mounted in a first bearing portion provided in the housing, and the second shaft portion is slidably mounted in a second bearing portion provided in the housing.

2. The electronic instrument according to claim 1, wherein the spring for battery ejection is formed as a formed-wire-spring formed by folding a single, elastic metal wire.

3. The electronic instrument according to claim 1, wherein the second arm portion is formed shorter than the first arm portion, and when the spring for battery ejection is pressed by the battery, the second shaft portion slides within the second bearing portion in a direction closer to the first shaft portion.

4. The electronic instrument according to claim 2, wherein the first arm portion and the second arm portion are formed straightly.

5. The electronic instrument according to claim 2, wherein the first arm portion is formed in a previously curved condition such that when the arm is pressed by the battery, it is stretched straightly.

6. The electronic instrument according to claim 1, wherein the first shaft portion and the second shaft portion are formed by folding in a direction opposed to each other.

7. The electronic instrument according to claim 1, wherein the first shaft portion and the second shaft portion are formed by folding in the same direction as each other.

8. The electronic instrument according to claim 1, wherein the spring force generation portion is formed to have a width that is larger than width between the first arm portion and the second arm portion.

* * * * *